(12) United States Patent
Cooley

(10) Patent No.: US 11,938,833 B2
(45) Date of Patent: Mar. 26, 2024

(54) TURBINE POWERED ELECTRIC OR HYBRID VEHICLE

(71) Applicant: Cooley Enterprises, LLC, Houston, TX (US)

(72) Inventor: Maryam Cooley, Houston, TX (US)

(73) Assignee: Cooley Enterprises, LLC, Houston, TX (US)

( * ) Notice: Subject to any disclaimer, the term of this patent is extended or adjusted under 35 U.S.C. 154(b) by 0 days.

(21) Appl. No.: 17/892,905

(22) Filed: Aug. 22, 2022

(65) Prior Publication Data

US 2024/0059164 A1 Feb. 22, 2024

(51) Int. Cl.
  *B60L 53/22* (2019.01)
  *B60L 8/00* (2006.01)
  *B60L 50/60* (2019.01)
  *B60L 53/24* (2019.01)

(52) U.S. Cl.
  CPC .............. *B60L 53/22* (2019.02); *B60L 8/006* (2013.01); *B60L 50/60* (2019.02); *B60L 53/24* (2019.02)

(58) Field of Classification Search
  CPC ........... B60L 53/22; B60L 8/006; B60L 50/60
  USPC .......................................................... 701/22
  See application file for complete search history.

(56) References Cited

U.S. PATENT DOCUMENTS

| | | | |
|---|---|---|---|
| 5,296,746 A | | 3/1994 | Burkhardt |
| 5,757,595 A | * | 5/1998 | Ozawa .................... B60L 58/12 340/455 |
| 7,384,239 B2 | * | 6/2008 | Wacinski ................ F03D 1/025 415/68 |
| 7,665,554 B1 | * | 2/2010 | Walsh ........................ F03D 9/32 180/2.2 |
| 7,808,121 B1 | * | 10/2010 | Glynn ....................... F03D 9/25 290/55 |
| 8,098,040 B1 | | 1/2012 | Botto |
| 9,770,990 B2 | | 9/2017 | Guthrie |
| 10,358,038 B1 | * | 7/2019 | Ripley ................... H02K 7/183 |
| 2006/0213697 A1 | * | 9/2006 | Sutherland ............... F03D 9/32 180/2.2 |

(Continued)

FOREIGN PATENT DOCUMENTS

| CN | 306586916 S | 6/2021 |
|---|---|---|
| DE | 3107167 A1 | 9/1982 |

(Continued)

OTHER PUBLICATIONS

Wo2017200018 Machine Translation, , Nemoto , 2017 (Year: 2017).*

(Continued)

*Primary Examiner* — Jacob S. Scott
*Assistant Examiner* — Michael E Butler
(74) *Attorney, Agent, or Firm* — Baker Botts L.L.P.

(57) ABSTRACT

An electric or Hybrid vehicle is provided, the electric or Hybrid vehicle including: a battery configured to provide motive power to the vehicle; one or more electrical systems controlling one or more operations of the vehicle; a turbine configured to be exposed to airflow while the vehicle is in motion; a generator coupled to the turbine and configured to generate electricity in response to rotation of the turbine; and a control system configured to selectively control flow of electricity from the generator to the battery for charging the battery and to the one or more electrical systems for powering the one or more electrical systems.

27 Claims, 22 Drawing Sheets

(56) References Cited

U.S. PATENT DOCUMENTS

| | | | |
|---|---|---|---|
| 2008/0263731 A1* | 10/2008 | Tabe | H02S 10/12 |
| | | | 903/905 |
| 2010/0140949 A1* | 6/2010 | Pitre | F03D 13/20 |
| | | | 290/55 |
| 2011/0260470 A1* | 10/2011 | Ahmadi | B60L 8/003 |
| | | | 290/55 |
| 2012/0153630 A1* | 6/2012 | Kildevaeld | H02K 53/00 |
| | | | 74/DIG. 9 |
| 2013/0306389 A1* | 11/2013 | Penev | B60L 8/003 |
| | | | 180/165 |
| 2013/0314023 A1 | 11/2013 | Collier | |
| 2016/0209681 A1* | 7/2016 | Hung | B32B 37/18 |
| 2017/0298907 A1* | 10/2017 | Menaskanian | H02K 16/00 |
| 2017/0342964 A1 | 11/2017 | Cianflone | |
| 2018/0297540 A1* | 10/2018 | Juhasz | A41B 1/08 |
| 2019/0225090 A1 | 7/2019 | Prieto | |
| 2021/0323430 A1* | 10/2021 | Kulik | B60L 8/003 |
| 2022/0010781 A1* | 1/2022 | Washington, Jr. | F03D 9/12 |
| 2022/0355673 A1* | 11/2022 | Balakrishnan | F03D 9/32 |

FOREIGN PATENT DOCUMENTS

| | | |
|---|---|---|
| DE | 102020002934 A1 | 9/2021 |
| EP | 3840192 A1 | 6/2021 |
| GB | 2592575 A | 9/2021 |
| WO | 2017200018 A1 | 11/2017 |
| WO | 2019053434 A1 | 3/2019 |
| WO | 2021053360 A1 | 3/2021 |

OTHER PUBLICATIONS

S.M. Ferdous; Walid Bin Khaled; Benozir Ahmed; Sayedus Salehin; Enaiyat Ghani Ovy Electric Vehicle With Charging Facility in Motion Using Wind Energy, Conference: World Renewable Energy Congress 2011—Sweden, May 8-11, 2011, 9 pages.

M. Zahir Hussain; R. Anbalagan; D. Jayabalakrishnan; D.B.Naga Muruga; M. Prabhahar; K. Bhaskar; S. Sendilvelan Charging of Car Battery in Electric Vehicle By Using Wind Energy, Sep. 2020, 6 pages.

* cited by examiner

US 11,938,833 B2

TURBINE POWERED ELECTRIC OR HYBRID VEHICLE

TECHNICAL FIELD

Embodiments of the present disclosure relate to electric and hybrid vehicles and, more particularly, to electric and hybrid vehicles equipped with wind turbines to provide additional power to the vehicle.

BACKGROUND

As global governments and policy makers have accelerated the shift to adopting a global vision of a clean energy future, there has been increased demand to accelerate innovations and technologies to provide clean transportation for people and goods. This aim has very ambitious targeted plans to reduce air pollution caused by internal combustion engines, creating an uneasy dynamic for automakers and consumers. The United States and European Union are proposing tough regulations on carbon dioxide emissions from cars sold that would effectively ban the sale of new cars with internal combustion engines after 2035. Governments around the world are fueling consumers' purchase of electric vehicles (EVs) with generous tax incentives and subsidies, and emission standards that are becoming more stringent. In response to global government regulations and policies, automakers are committing many tens of billions of dollars over the next decade to EV development. But no matter how much material investment is made, shifting such a vast industrial and consumer ecosystem that is so basic to the economy faces big challenges. Even as the shift to EVs and Hybrid vehicles accelerates, there are significant vehicle owner challenges that stand out for this transformation to take place smoothly.

One significant challenge is mining and supply chains to support the shift to EV and Hybrid vehicles. In particular, EVs and Hybrid vehicles are expensive due to the cost of the materials required, e.g., to produce the batteries.

The second challenge is the necessary infrastructure needed to support EVs in the post internal combustion vehicle era. This necessitates the building and securing of a ubiquitous EV charging station, modifications to existing infrastructure, and the modernization and expansion of the electric grid to avoid power disruptions.

The third, and possibly largest, challenge involves the consumers buying the vehicles, and their need for sustainable reliability of the vehicles. Many people have EV range "anxiety." That is, they worry about how far they can travel in EVs before the battery runs out, possibly leaving them stranded. For most people, one of the largest capital expenditures (after their homes) are their vehicles. Beyond early adopters, most people still do not trust the reliability of EVs, coupled with the freedom restrictions for long distance travel, making the decision to change from internal combustion vehicles to EVs more difficult and unlikely. EV's inadequate driving ranges, along with the inability to make vehicle owners feel safer and more confident in their vehicles, has created a negative consumer mindset towards the EV movement. It is now recognized that a need exists for solutions that can be offered by automakers to help overcome the buyer's current anxiety in switching from internal combustion vehicles to more sustainable EV or Hybrid vehicles.

In particular, a need exists for technologies for reliably charging the battery of EVs or Hybrid vehicles while driving. This would allow both the vehicle buyers and the vehicle manufacturers to benefit from making the switch to EVs, since the drivers would not have to stop to re-charge batteries frequently and could make longer road trips more comfortable. Under certain circumstances, the actual fuel re-charge could be "free". In addition, providing methods for recharging of the vehicle battery while driving could ultimately reduce the costs needed for the battery, since a smaller battery could be used to meet the vehicle's operational requirements. This would lead to a decrease in the cost of EVs and Hybrid vehicles along with an increase in drivers' confidence on the road, thereby resulting in greater cooperation with the global transition to EVs and a faster reduction in emission of fossil fuels.

BRIEF DESCRIPTION OF THE DRAWINGS

For a more complete understanding of the present disclosure and its features and advantages, reference is now made to the following description, taken in conjunction with the accompanying drawings, in which:

FIGS. 10-14A are examples of other EV or Hybrid vehicles equipped with multiple turbines, in accordance with an embodiment of the present disclosure;

DETAILED DESCRIPTION

Figure 1:
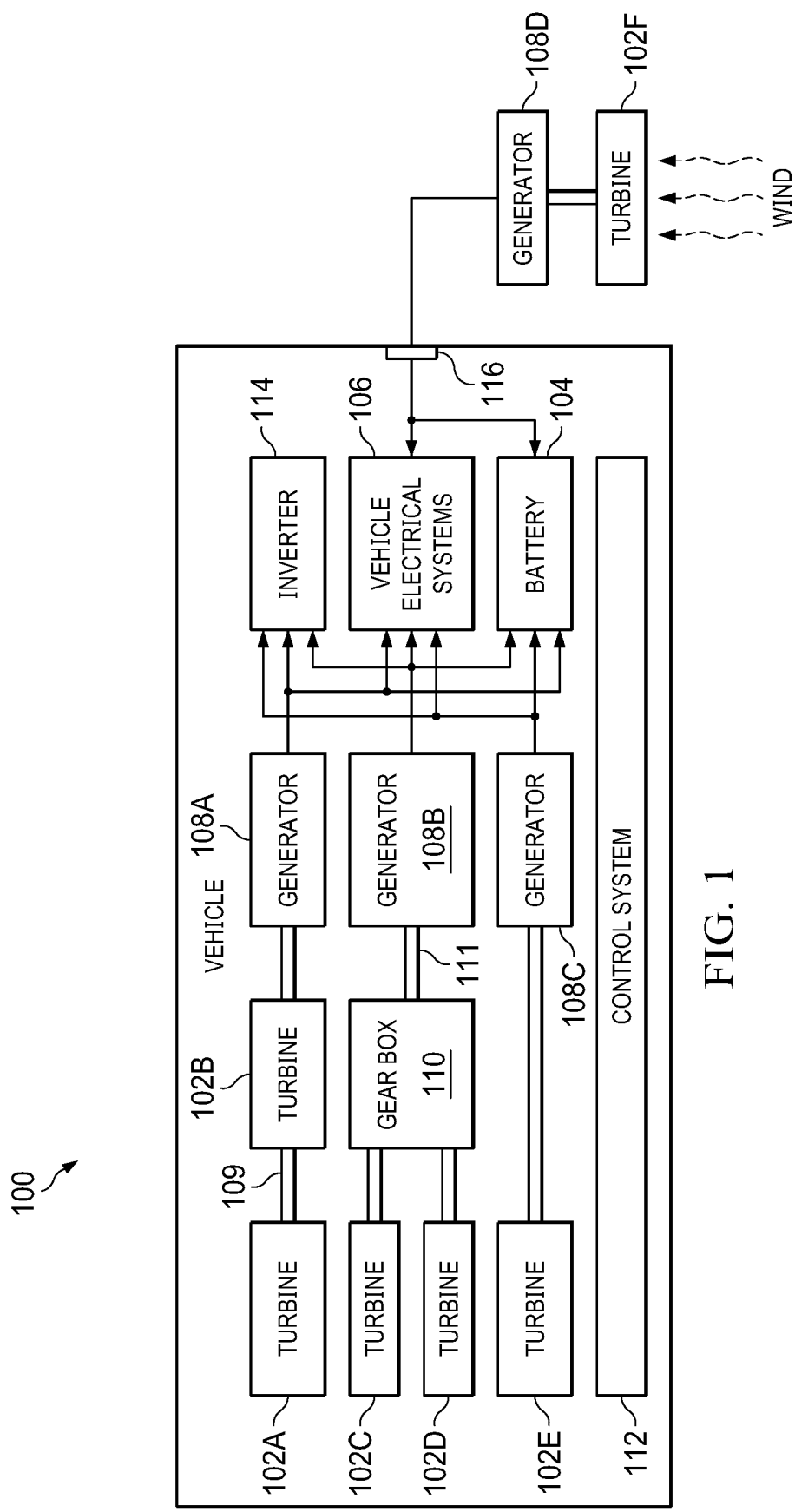
FIG. 1 is a system representing an EV or Hybrid vehicle with a plurality of turbines for powering the vehicle, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure provides a vehicle (which may be an electric vehicle (EV) or Hybrid vehicle) having a battery configured to supply motive power to the vehicle and at least one turbine configured to convert wind energy into power for at least recharging the battery. The power generated by the one or more turbines of the vehicle may also be used to provide energy directly to one or more electrical systems of the vehicle to the power electrical system(s). In some embodiments, the vehicle may also be equipped with a solar power generation system comprising solar cells or panels on an outside of the vehicle configured to provide additional energy for recharging the battery, directly powering one or more electrical systems of the vehicle, or both. The solar cells or panels may be disposed on a body of the vehicle, on one or more blades of the turbine, or both. The vehicle may be an electric or Hybrid car, truck, bus, train, plane, or boat. Other variations of the present disclosure are provided below and with reference to the figures.

The disclosed embodiments address the arising need for a cost-effective, efficient and clean system to extend the life of vehicle batteries in EVs and Hybrid vehicles to allow for long distance travel without the need to make frequent stops to re-charge the battery. The technology of wind turbines (e.g., micro-turbines) is designed to effectively harness free wind energy that is a clean, indigenous, renewable energy fuel source. This can help accelerate the movement of EVs much easier for both the vehicle buyers and automakers. The technology focuses on the use of turbines placed in aesthetically viable locations to accommodate for thousands of different vehicle models, sizes, and shapes. The vehicle's turbines convert kinetic energy in the wind into mechanical power, which is then converted into electricity by a small turbine generator. The electricity generated can be used in two primary vehicle applications. One application is the direct use of electricity generated to operate the vehicle, e.g., to power one or more electrical systems of the vehicle. Second is the use of the electricity generated to re-charge the battery used to provide at least part of the motive power to the vehicle. When a vehicle is driving, the wind turns the propeller-like blades of a turbine around a rotor. The speed of the vehicle, and the number of driver's starts/stops, determines how fast the battery can be charged. For long-distance travel, assumptions can be made that for some periods of time, a vehicle driver can maintain higher speeds (e.g., from 20 miles/hour to upwards of 70 miles/hour) to help to re-charge the vehicle battery faster, and the excess electricity generated may then be used for direct use to operate electrical systems of the vehicle.

The disclosed embodiments may solve several problems for both consumers and automakers. For example, the use of turbine(s) to recharge a vehicle battery during vehicle movement may enhance the reliability of the onboard battery to supply motive power, which remains a primary barrier to widespread acceptance of EVs and Hybrid vehicles. In addition, the disclosed vehicles may reduce, mitigate, or eliminate consumer road-travel-range related anxiety and concerns. In addition, the disclosed vehicles may have a lower cost since smaller batteries may be used to travel the same distance before needing to pull over for recharging. The disclosed vehicles may also reduce the need for excessive numbers of charging stations to be built, thereby reducing the cost of infrastructure needed to implement clean transportation.

Turning now to the drawings, FIG. 1 illustrates a system including an EV or Hybrid vehicle 100 with a plurality of turbines 102 (e.g., 102A-102F). The vehicle 100 includes a battery 104 configured to provide motive power to the vehicle 100. The battery 104 may provide a portion of or all motive power to the vehicle 100. The vehicle 100 may be an electric or Hybrid car, truck, bus, train, plane, or boat, or any other type of vehicle that uses a battery to provide a portion of or all motive power to the vehicle.

The vehicle 100 may also include one or more electrical systems 106 controlling one or more operations of the vehicle 100. The one or more electrical systems 106 may include a primary electrical system used to provide motive power to the vehicle 100. As such, the one or more vehicle electrical systems 106 may include a motor used to convert electrical energy from the battery 104 (and directly from the generators 108) to rotational energy on one or more axles/wheels (or propellers, on a boat) used to move the vehicle 100. The one or more electrical systems 106 may control the operations of one or more auxiliary functions of the vehicle (i.e., not providing motive power). As such, the one or more vehicle electrical systems 106 may include components that operate, for example, power steering, power windows, headlights or other exterior lights, interior lights, windshield wipers, a defroster, sensors, an audio system, digital communication systems, and/or one or more displays, among others.

The turbines 102 are configured to be exposed to airflow (e.g., wind) while the vehicle 100 is in motion. The airflow may be the direct result of the motion of the vehicle and/or the result of ambient wind already present in the environment. Although six turbines 102 are illustrated in the vehicle 100 of FIG. 1, it should be noted that any number of turbines 102 (e.g., as few as one, two, three, four, five, seven, eight, nine, ten, up to twenty, up to thirty, up to fifty, or more) may be present in the vehicle 100 in other embodiments. For a given turbine 102, a generator 108 (e.g., 108A-108D) is coupled to the turbine 102 and configured to generate electricity in response to rotation of the turbine 102. This mechanism is described in detail below with reference to FIG. 3.

In some embodiments, a generator (e.g., 108C) may be coupled to a single turbine (e.g., 102E) to generate electricity in response to rotation of the turbine. In some embodiments, a generator (e.g., 108A, or 108B) may be coupled to two or more turbines (e.g., 102A-B, or 102C-D). For example, the turbines 102A and 102B are coupled in series to the generator 108A. That is, the turbine 102B is coupled along a shaft 109 between the turbine 102A and the generator 108A. As another example, the turbines 102C and 102D are coupled in parallel to the generator 108B. More specifically, the turbines 102C and 102D may be coupled in parallel to a gearbox 110 coupled to the generator 108B. The gearbox 110 may be coupled to the generator 108B via a single shaft 111. For vehicles 100 in which a generator 108 is configured to convert rotational energy from multiple turbines 102 into electrical energy, one or more of the turbines 102 may be separated from the corresponding generator 108, and a larger generator may be used than a generator used with a single turbine 102.

The electricity generated from rotation of the one or more turbines 102 in the vehicle 100 may be used to recharge the battery 104 and/or to directly power the one or more vehicle electrical systems 106. Directing electrical energy to power to the electrical systems 106 ultimately reduces the load on the battery 104, so that more energy stored in the battery 104 may be used to provide motive power to the vehicle 100. The vehicle 100 may include a control system 112 configured to selectively control flow of electricity from the generator(s) 108 to the battery 104 for charging the battery 104 and to the one or more electrical systems 106 for powering the one or more electrical systems 106. The control system 112 includes a processor and a memory containing at least one set of instructions that, when executed by the processor, cause the control system 112 to control (e.g., via switches) the direction of flow of electricity generated by the onboard generators 108, e.g., toward the battery 104 for charging, toward one or more electrical systems 106 for operation, or both. When the battery 104 is fully charged, all electrical energy collected via the turbines 102 and generators 108 may be used to power the vehicle electrical systems 106. In some embodiments, the electrical energy collected via the turbines 102 and generators 108 may be directed to the battery 104 first before diverting the electrical energy to the electrical systems 106. In other embodiments, the electrical energy collected via the turbines 102 and generators 108 may be directed to power the electrical systems 106 first, and then any excess electrical energy sent to recharge the battery 104. In still other embodiments, the electrical energy collected may be split in any desired proportions between the battery 104 and the electrical systems 106, and the proportions may be adjusted throughout operation of the vehicle 100 via the control system 112.

The control system 112 may be coupled to one or more sensors (not shown) that provide feedback used by the control system 112 to control the direction of flow of electricity from the one or more generators 108 to the battery 104 and/or the vehicle electrical systems 106. In addition, the one or more sensors may be used to determine a direction in which the most wind is blowing over the vehicle 100 at a certain time and the control system 112 may output control signals (e.g., to an actuator) to change a direction in which a turbine 102 is facing in response to the wind sensor feedback. In some embodiments, the control system 112 may be communicatively coupled to a display (e.g., on a dashboard) of the vehicle 100 and used to output an indication of how much the battery 104 has been recharged by the turbines 102 or how much energy has been converted from the wind via the turbines 102 to power to the vehicle 100. The display may also indicate how fast the battery 104 is being recharged, or how fast the battery 104 can be recharged should the operator of the vehicle 100 maintain a certain speed to allow for consistent wind-flow through the one or more turbines 102. This may allow the vehicle operator to alter driving habits to maximize the recharging of the battery 104 and prolong the distance the vehicle 100 could travel without needing an external charge.

The disclosed wind turbine system offers the dual option for utilization of reliable wind power created by the driven vehicle 100, either for direct use of electricity generated to power the electrical system(s) 106 of the vehicle reducing the load on the vehicle's battery, or to recharge the battery 104 while driving.

As illustrated, the vehicle 100 may further includes one or more inverters 114 coupled to the generators 108. The inverter 114 may be configured to convert electricity output from one or more of the generators 108 to an AC voltage that is usable in the electrical systems 106 of the vehicle 100. The inverter 114 may similarly be used to convert electricity output from the battery 104 to an AC voltage usable in the electrical systems 106 as well. The control system 112, one or more wind sensors (e.g., a vane), bearings, the inverter(s) 114, and other components can be used to maintain balance and control of electrical energy moving through the system to avoid overcharging, overheating, or other damage to the battery 104.

In some embodiments, one or more of the turbines 102 may form part of a body of the vehicle 100. The term "body" refers to the external structure of the vehicle 100, a chassis of the vehicle 100, and so forth. By forming part of the body of the vehicle 100, a turbine 102 may form a structural part of the body of the vehicle 100, thereby replacing what would otherwise be present in that portion of the frame of the vehicle 100. As such, the blades of the turbine may form part of a grill, a hood, a roof, a roof rack, a side panel, a windshield a back door, a headlight, a side view mirror, an undercarriage, or a bumper of the vehicle 100. In other embodiments, the turbine 102 forming part of the body of the vehicle 100 may be located just outside of or over a portion of an existing structural frame of the vehicle 100. Several examples of turbines 102 forming part of a body of the vehicle 100 are illustrated in subsequent figures.

In other embodiments, one or more of the turbines 102 may be clipped on, strapped on, or permanently installed to a section of the vehicle 100. In this manner, the vehicle 100 may be retrofit with one or more turbines 102. As illustrated in FIG. 1, the vehicle 100 may include an electrical port 116 coupled to the battery 104 and/or to the one or more vehicle electrical systems 106. This electrical port 116 allows one or more turbines (e.g., 102F) and a corresponding generator (e.g., 108D) to be retrofit onto the body of the vehicle 100 via a connection at the electrical port 116. The turbine(s) 102 may be clip-on mounted, thereby offering flexibility to be removed according to a consumer's preference. This method offers the use turbine(s) only as needed or on-demand.

Figure 2:
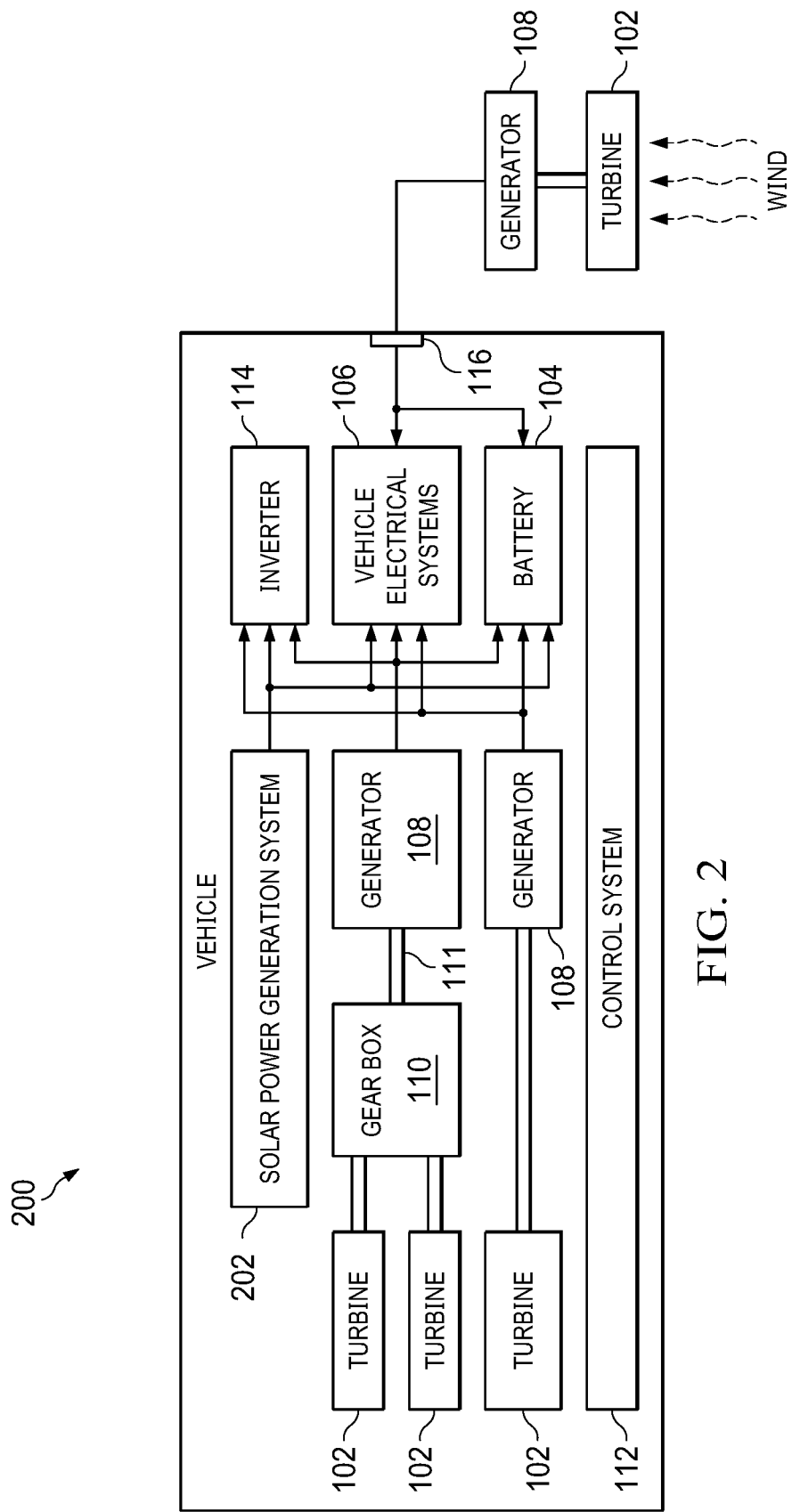
FIG. 2 is a system representing an EV or Hybrid vehicle with a plurality of turbines and solar cells or panels for powering the vehicle, in accordance with an embodiment of the present disclosure.

FIG. 2 illustrates another system including an EV or Hybrid vehicle 200 with a plurality of turbines 102 along with a solar power generation system 202. As illustrated, the vehicle 200 of FIG. 2 may include turbine(s) 102 and corresponding generator(s) 108, gearbox 110, battery 104, vehicle electrical system(s) 106, control system 112, inverter 114, and electrical port 116, which are structurally and functionally similar to those discussed at length above with reference to FIG. 1. The vehicle 200 includes a solar power generation system 202 to collect renewable energy from the sun in addition to the renewable energy collected via the turbines 102 on the vehicle 200. The solar power generation system 202 may generally include one or more solar cells or panels disposed on an outside surface of the vehicle 200. As shown and described below in reference to FIG. 19, the solar cells or panels may be disposed on the body of the vehicle, on one or more blades of any of the turbines 102, or both. The solar power generation system 202 is configured to generate electricity from solar energy collected via the cells or panels. The generated electricity may be output from the solar power generation system 202 to the battery 104 for charging the battery 104, to the one or more vehicle electrical system 106 for operating the electrical systems 106, or both. The control system 112 may be configured to selectively control flow of electricity from the solar power generation system 202 to the battery 104 for charging the battery 104 and to the one or more electrical systems 106 for powering the one or more electrical systems 106, similar to the electricity generated via the turbines 102 and their associated generators 108.

The vehicle 200 of FIG. 2 may be used to capture every bit of wind and solar energy that is available around the vehicle 200, while the vehicle is in motion and/or when the vehicle is stopped. The solar power generation system 202 and the turbines 102/generators 108 may continuously collect energy from the environment to reduce the load on the battery 104 and/or to recharge the battery 104 of the vehicle 200.

Figure 3:
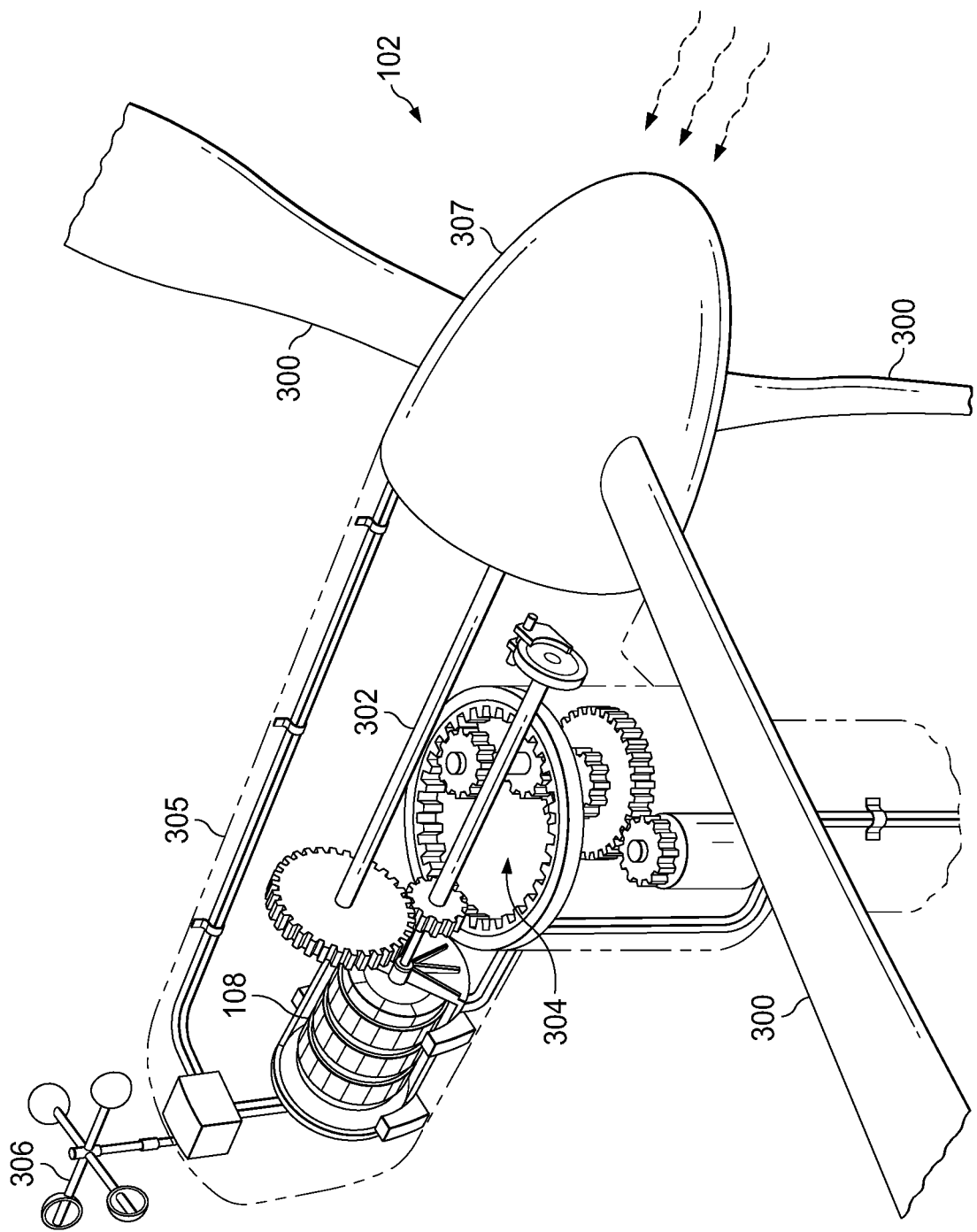
FIG. 3 is a perspective cutaway view of an example turbine for use in an EV or Hybrid vehicle, in accordance with an embodiment of the present disclosure.
Figure 20:
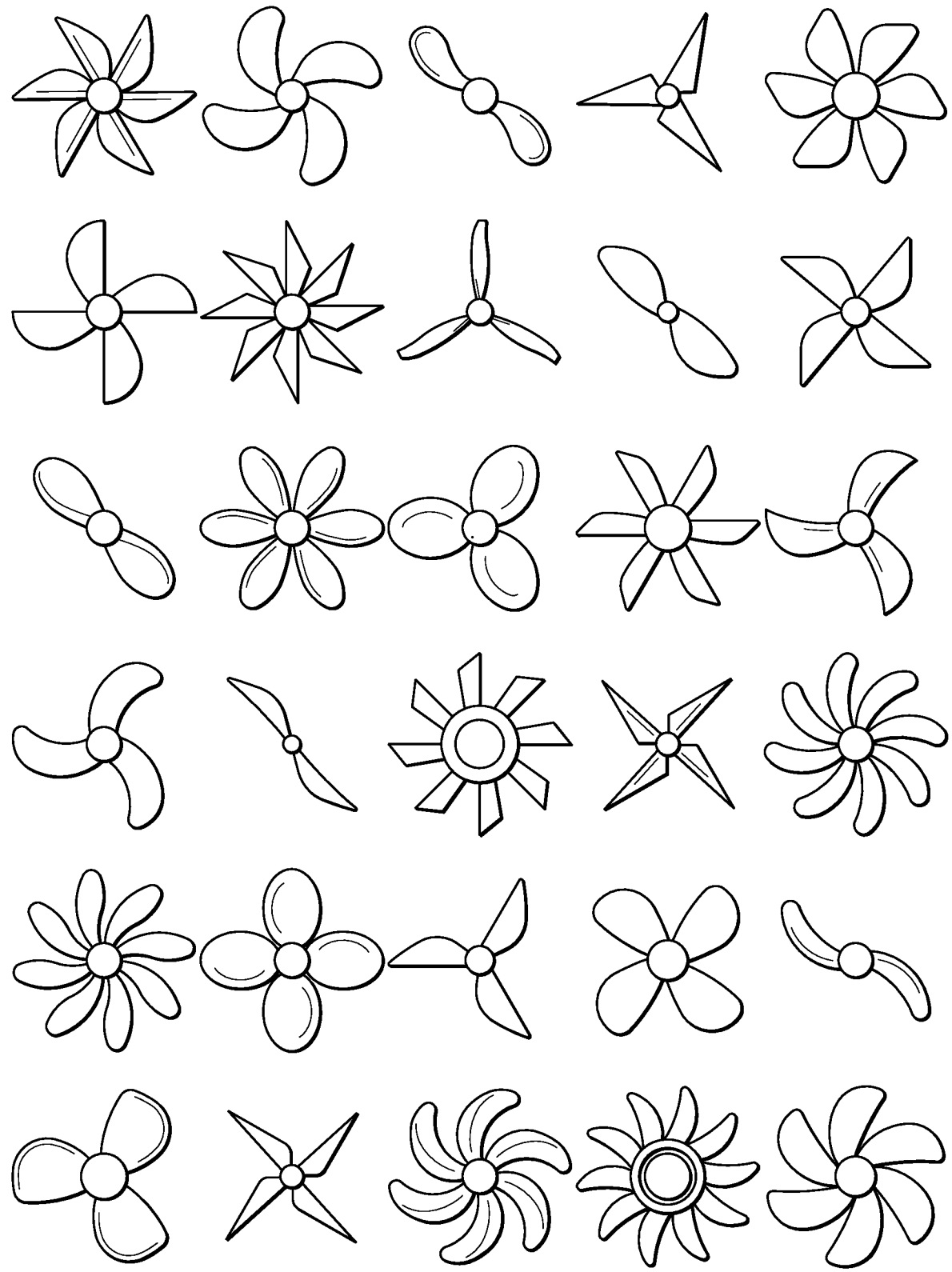
FIG. 20 is a series of example arrangements of blades of a turbine for use in an EV or Hybrid vehicle, in accordance with an embodiment of the present disclosure.

FIG. 3 illustrates an example turbine 102 for use in an EV or Hybrid vehicle. As illustrated, the turbine 102 may include a plurality of blades 300. Although three blades 300 are shown in the illustrated embodiment, the wind turbine 102 may include numbers of blades 300 ranging from single-blade to dual-blade to three-blade to multi-blades. Other embodiments of a turbine 102 for use in an EV or Hybrid vehicle may include other numbers, shapes, sizes, or arrangements of blades 300. For example, FIG. 20 illustrates thirty different arrangements of blades that may be used in a turbine 102 in accordance with the present disclosure, and many others are possible as well.

Each turbine 102 may be used to turn applicable wind energy into electricity using the aerodynamic force from the blades 300. The blades 300 are coupled to a rotatable shaft (i.e., "rotor") 302. The blades 300 may function like any airplane wing or helicopter rotor blades. For example, when the wind flows across the blade 300, the air pressure on one side of the blade 300 decreases. The difference in air pressure across the two sides of the blade 300 creates both lift and drag, and when the force of the lift is stronger than the drag, this causes the rotor 302 to spin. The rotor 302 may be connected directly to the generator 108 in certain embodiments. In other embodiments, the rotor 302 may be connected to the generator 108 via a shaft and a series of gears 304 that sped up the rotation and allow for a physically smaller generator 108 to be used to generate electricity. This translation of aerodynamic force to rotation of the generator 108 results in an ongoing generation of electricity used for re-charging the battery and allowing for cleaner, efficient, safer, and more reliable travels using the vehicle.

As illustrated, in some embodiments, the generator 108 may be integrated with the turbine 102. For example, the generator 108 may be located in a housing 305 immediately attached to the rotatable blades 300 of the turbine 102. This arrangement of the turbine 102 may be particularly useful in areas of the vehicle that have additional storage space, such as in or next to a trunk of the vehicle, a truck bed, or a front storage area (e.g., under the hood of the vehicle). In other embodiments, the generator 108 may be located in a housing that is separate from and positioned apart from the turbine 102, and coupled to the turbine 102 via a shaft (e.g., as shown in FIG. 1). In some embodiments, the generator 108 may include sound proofing incorporated in the housing 305 that provide a silent generator 108 used to convert the wind energy to electricity in the vehicle.

In some embodiments, the turbine 102 may be disposed over or form part of a headlight of a vehicle. In such instances, a nose 307 of the turbine 102 located at a center portion where the blades 300 come together may encase a light bulk. As such, the nose 307 may itself form the headlight of the vehicle. In other embodiments, the headlight may include multiple bulbs located at positions that substantially surround the turbine 102.

The metallurgy of the blades 300 of the turbine 102 can range in cost and strength. For example, carbon fibers may be incorporated in the turbine blades 300, as these are often the fibers of choice in many aerospace applications. As another example, E-glass fibers used in aerospace applications can also be used in the turbine blades 300, which may be beneficial due to its low cost. Customized mixed fibers may provide a higher specific modulus and higher specific strengths than basic glass fiber. Additional metallurgies such as alloys and/or superalloys can be used in construction of the blades 300. Such superalloys may include nickel-based superalloys that incorporate chromium, cobalt, and rhenium. The blades 300 may include various types of metal such as aluminum or steel, carbon fiber, flexible rubber, or a variety of plastics. Other aeroelastic blade types with lighter weight materials may be considered as well based on future materials development for blades. This technology captures and maximizes the utilization of wind energy to offer a cost-effective renewable energy fuel source that other than the initial installation cost, may provide free re-charge of the vehicle battery during vehicle operation.

In some embodiments, the turbine 102 may comprise one or more blades 300 comprising a smart display sheet that is either adhered thereto or integrated thereon. A smart display sheet is described in further detail below with reference to FIG. 4.

More than one type (e.g., size, shape, or arrangement) of turbine 102 may be used on the same vehicle, thereby offering greater efficiencies to capture more wind-created electricity from all directions and increasing the speed to re-charge the vehicle battery as well as excess energy for direct use in vehicle electrical systems. Most production of electricity can be achieved from multi-rotor wind turbines 102, e.g., as shown in FIG. 3.

There is great flexibility and variety to the types of locations where turbines 102 may be placed on a vehicle, as shown below with reference to FIGS. 4-19. The rotor 302 of the turbine 102 may be aligned with a horizontal-axis, vertical-axis, or at an angle. In some embodiments, the turbine 102 may be placed in open areas of the vehicle (such as rooftop, side panel, back, etc.) that allow for adjustment of the rotational axis of the turbine 102, e.g., with auto-adjustment of the angles of the blades as well. Adjustment of the rotational axis and/or the blades may be controlled (e.g., via control system 112 of FIGS. 1 and 2) based on feedback from one or more wind sensors 306 incorporated into the turbine 102 and/or located proximate to the turbine 102 on the vehicle. Based on feedback from wind sensors 306, the blades may be repositioned as needed to capture maximum wind speeds. The blades may be repositioned such that each blade is rotated about an axis of the individual blade in response to the wind sensor feedback. Additionally, or alternatively, the blades may be repositioned via a single rotation of the entire turbine with respect to the vehicle.

The disclosed embodiments offer a variety of scalable wind turbine blades 300 and generators 108 to support a variety of designs for both existing and future vehicles, as shown in the remaining figures. To maximize efficiency, the location turbine blades 300 may be an important factor to not only benefit from wind generated by the speed of the vehicle, but also from prevailing winds caused by naturally occurring weather patterns or a gully of wind power offered when moving downhill, inside canyons, other zones of special wind formed by landforms.

Figure 4:
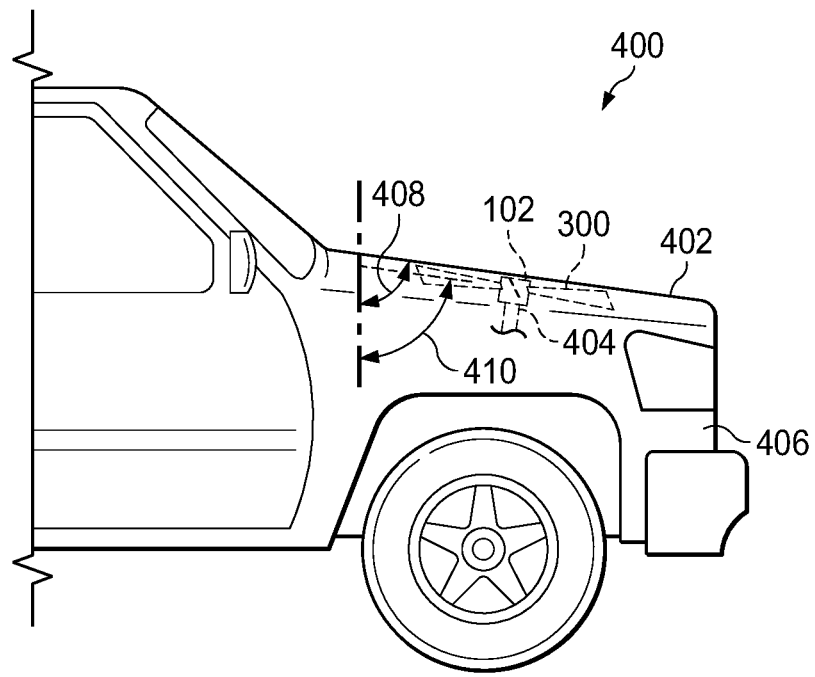
FIGS. 4 and 5 are side partial cutaway views of an example EV or Hybrid vehicle having a turbine located on the hood, in accordance with an embodiment of the present disclosure.

FIG. 4 illustrates an example EV or Hybrid vehicle 400 having a turbine 102 located on the hood 402 thereof. In certain embodiments of the present disclosure (e.g., as exemplified in FIG. 4), the turbine 102 may include a plurality of blades 300 coupled to a shaft 404, with the plurality of blades 300 being oriented substantially parallel to a portion (e.g., hood 402) of a body 406 of the vehicle 400. As illustrated, for example, an angle 408 of the surface (e.g., hood 402) of the body 406 of the vehicle 400 with respect to vertical may be substantially equal to an angle 410 of the blades 300 (in radial directions from the shaft 404) with respect to vertical. The term "substantially" may mean within 5 degrees, within 2 degrees of, or within 1 degree of, the same angle, or within 10%, 5%, 2%, or 1% of the same angle. This provides a turbine 102 having a very low profile along the vehicle. This angling of the turbine 102 to correspond with the outer body 406 of the vehicle 400 may minimize drag on the vehicle while still capturing adequate wind energy.

Vehicle owners may be find it desirable for the turbine(s) 102 to "blend" with the rest of the vehicle 400, thereby improving vehicle aesthetics and reducing distractions to a driver of the vehicle 400. This is accomplished in the embodiment of FIG. 4, for example, by having the blades 300 of the turbine 102 actually act as a portion of the hood 402 of the vehicle 400. The blades 300 of the turbine 102 form a single structure that takes the place of what would otherwise be present structurally at that location of the hood 402. The blades 300 may be painted the same color as the rest of the vehicle 400 to maintain a smooth visual effect.

Additional features may be applied to the blades 300 of a turbine 102 to make them blend in with the rest of the vehicle 400. For example, in some embodiments, a smart display sheet may be adhered to or integrally formed into at least a portion of the blades of the turbine 102. Additionally, a similar smart display sheet may be adhered to or integrally formed into at least a portion of an externally visible component of a vehicle such as an outer body or wheels of the vehicle. In either case, the smart display sheet innovation can use pixel-based resolution display sheet images and/or path-line-based display sheet images. In the case of pixel base, the images are produced by pixels or tiny dots containing unique color and tonal information that come together to create the image on the vehicle's smart sheet (including the turbine blades' smart sheet(s)). Further details regarding the smart display sheet can be found in pending U.S. patent application Ser. No. 17/824,715, which is incorporated herein by reference. Applying such a smart display sheet to the blades 300 of the turbine 102 may enable the turbine to be disguised to match the surrounding portions of the outer body of the vehicle, providing aesthetic concealment of the turbine.

Figure 5:
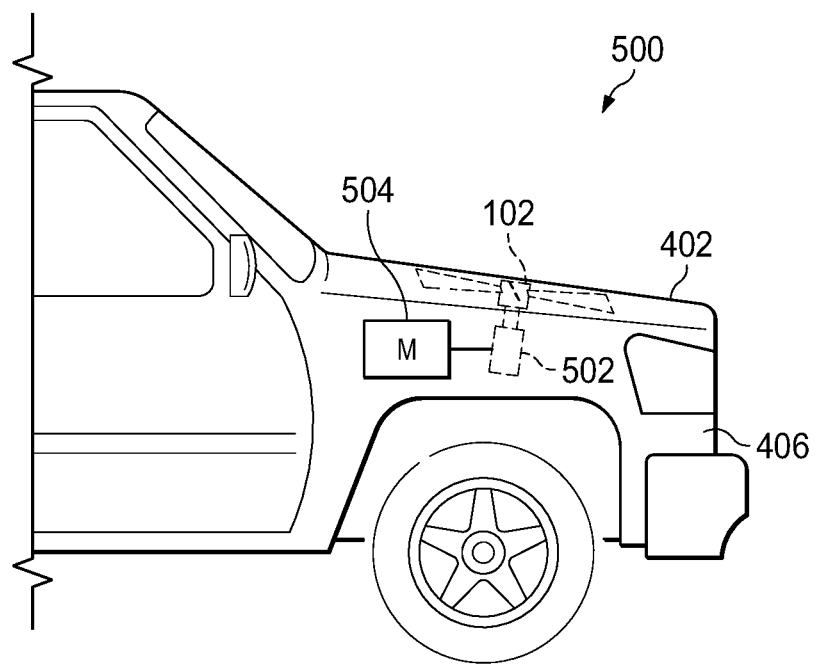

FIG. 5 illustrates another example EV or Hybrid vehicle 500 having a turbine 102 located on the hood 402 of the vehicle 500. As shown in FIG. 5, another way to help the turbine 102 blend in with the rest of the vehicle 500 is to enable the turbine 102 to be retracted into the body 406 of the vehicle 500 when it is not in use. For example, the blades 300 of the turbine 102 may be coupled to a shaft 502 that has an adjustable length, thereby enabling the blades 300 to be retracted and concealed (e.g., under the hood 402 of the vehicle 500). When the vehicle 500 is in motion and wind is available, the shaft 502 may be lengthened to raise the turbine blades 300 to a level slightly above the hood 402 to capture available wind energy. When the vehicle 500 is stopped or a driver decides that they want to aesthetically conceal the blades 300, the shaft 502 may be shortened to lower the turbine blades 300 to a level equal with the rest of the hood 402 or retracted to a position below the hood 402. At least a portion of the shaft 502 may be attached to an actuator 504 such as a motor (M), a hydraulic actuator, or a pneumatic actuator to telescope the length of the shaft 502 as desired.

Figure 6:
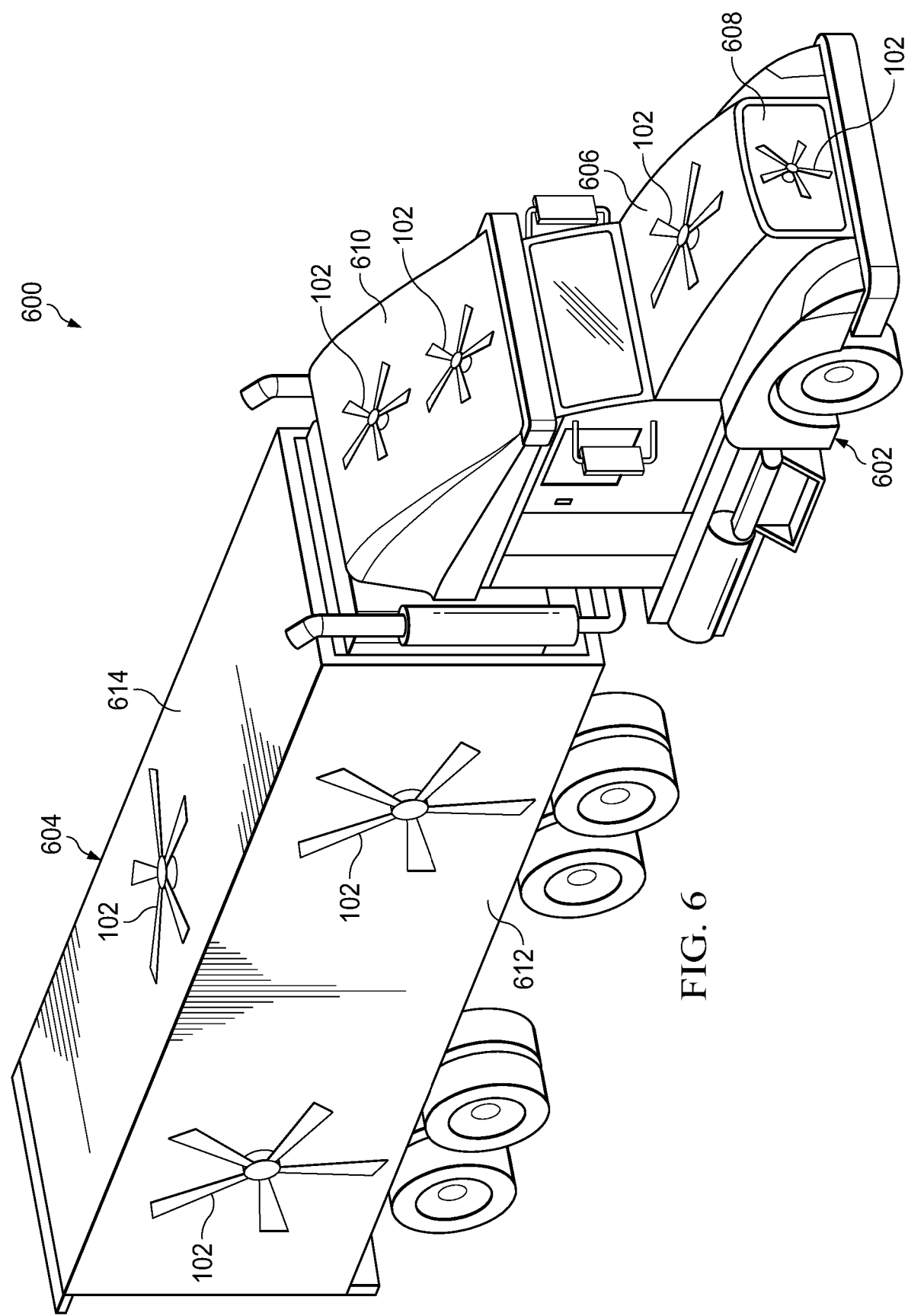
FIGS. 6 and 7 are examples of EVs or Hybrid vehicles equipped with multiple turbines, in accordance with an embodiment of the present disclosure.

FIG. 6 illustrates an example EV or Hybrid vehicle 600 equipped with multiple turbines 102 at various locations. In the illustrated embodiment, the vehicle 600 is a semi-trailer truck having a cab or tractor portion 602 and a trailer portion 604. As illustrated, the turbines 102 on the trailer portion 604 may be larger than those on the tractor portion 602. Turbines 102 may be located on or form part of a hood 606, a grill 608, and a roof 610 of the tractor portion 602. In addition, turbines 102 may be located on or form part of a side panel 612 and a roof 614 of the trailer portion 604. Other numbers, sizes, locations, and arrangements of turbines 102 may be used in other embodiments.

Figure 7:
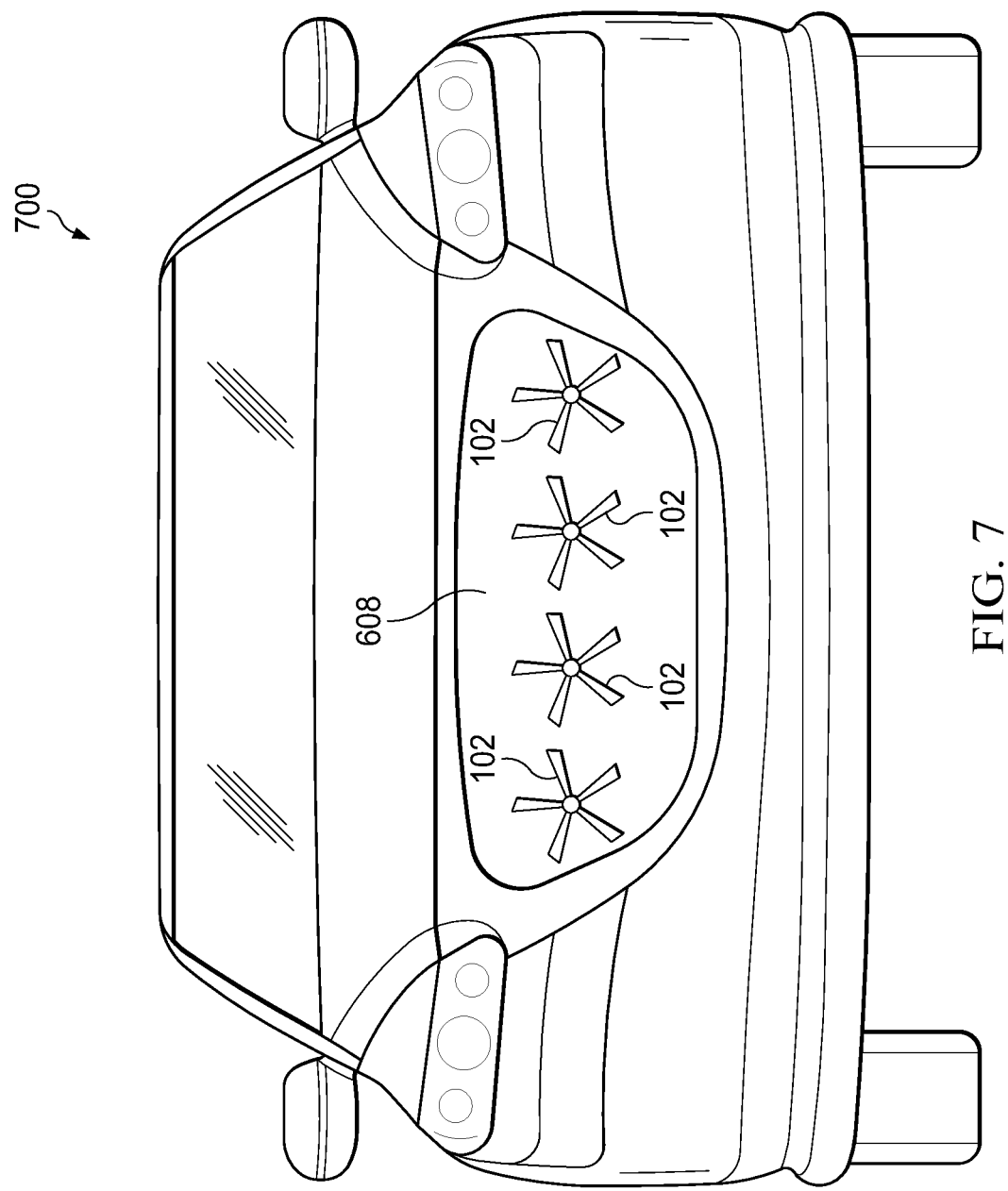

FIG. 7 illustrates another example EV or Hybrid vehicle 700 equipped with multiple turbines 102. In the illustrated embodiment, the vehicle 700 is a car (e.g., sedan). As illustrated, multiple turbines 102 may be located on or form part of a grill 608 of the vehicle 700. The turbines 102 may be grill mounted or concealed to appear like the front vehicle grill 608. Other numbers, sizes, locations, and arrangements of turbines 102 may be used in other embodiments.

Figure 8:
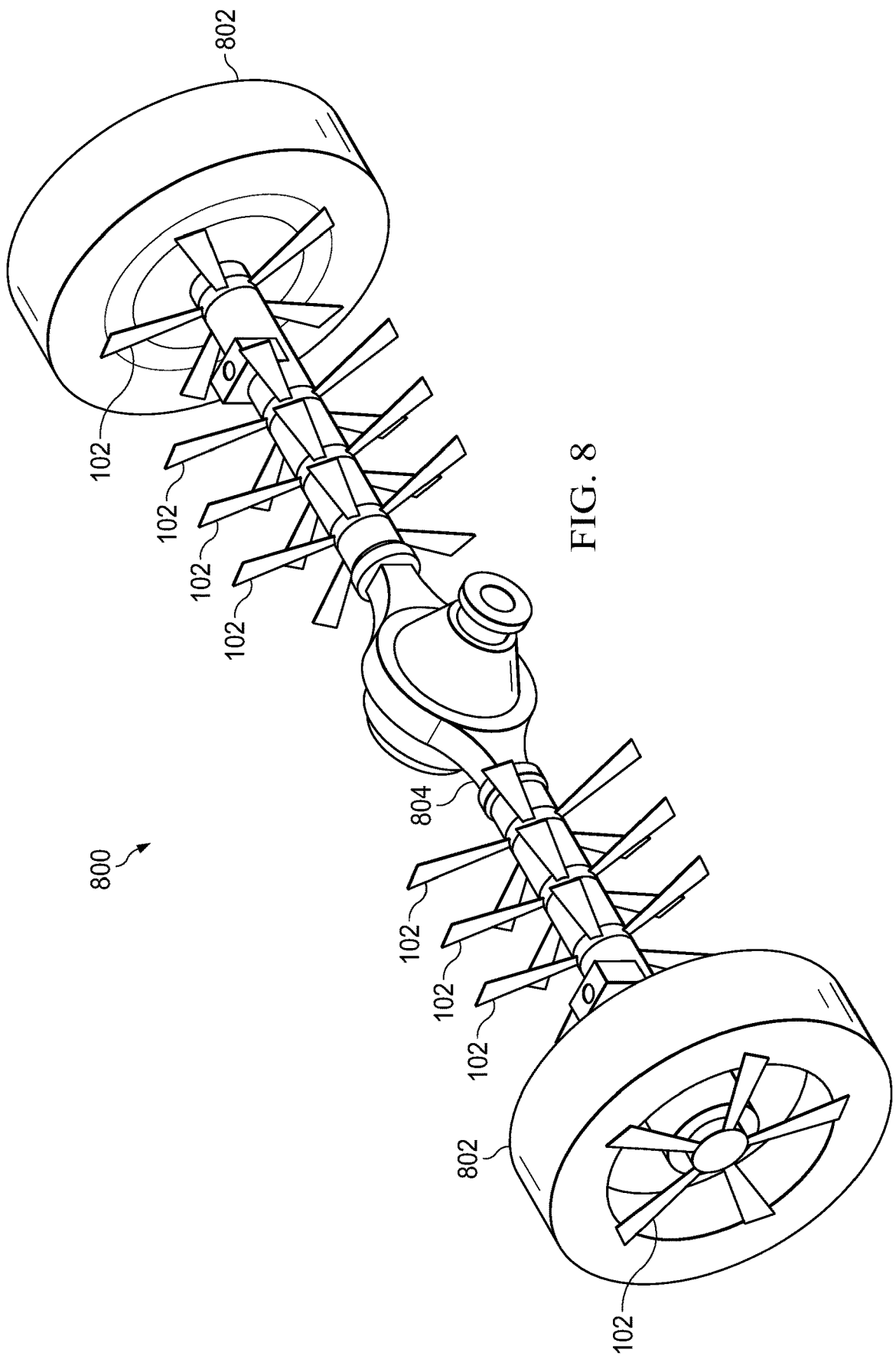
FIG. 8 is a perspective view of an example system including wheels, an axle connecting the wheels, and multiple turbines for use in an EV or Hybrid vehicle, in accordance with an embodiment of the present disclosure.
Figure 9A:
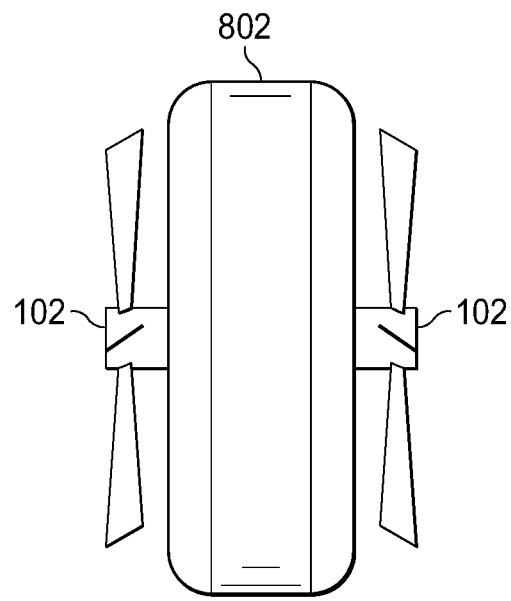
FIGS. 9A and 9B are front and side views of an example tire equipped with turbines for use in an EV or Hybrid vehicle, in accordance with an embodiment of the present disclosure.
Figure 9B:
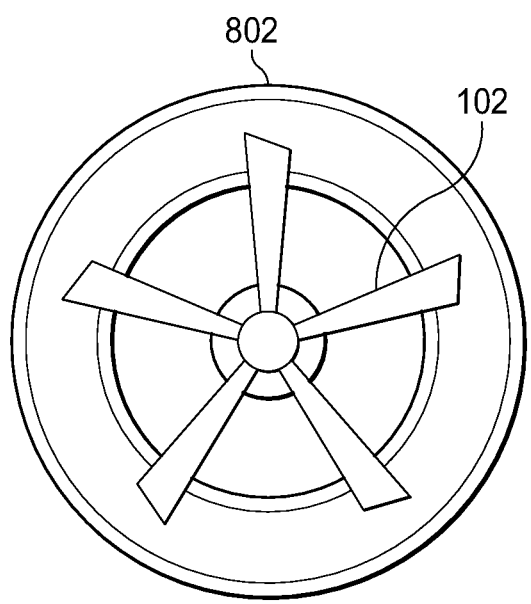

FIG. 8 illustrates an example system 800 including wheels 802, an axle 804 connecting the wheels 802, and multiple turbines 102 for use in an EV or Hybrid vehicle. FIGS. 9A and 9B illustrate an example setup of a single wheel 802 of the system 800 of FIG. 8. As illustrated, one or more turbines 102 may be located proximate to a wheel 802 of the vehicle. In some embodiments, the turbines 102 may replace hubcaps of the wheels 802. An adjustable rotating rod may allow for single or two-sided turbine 102/wheel 802 access, so that the turbines 102 can remain in a stationary position with respect to the wheels 802 or extend inward/outward from the wheel 802. In some embodiments, the blades of the turbine(s) 102 on a tire 802 may be constructed from a tire material so as to blend in with the rest of the tire 802. In addition, one or more turbines 102 may be located along an axle 804 used to turn a wheel 802 of the vehicle. The turbines 102 located on the axle 804 and/or on either or both sides of the wheels 802 may be configured to rotate freely with air flowing around the vehicle independent of the rotation of the axle 804 and wheels 802 of the vehicle.

Figure 10:
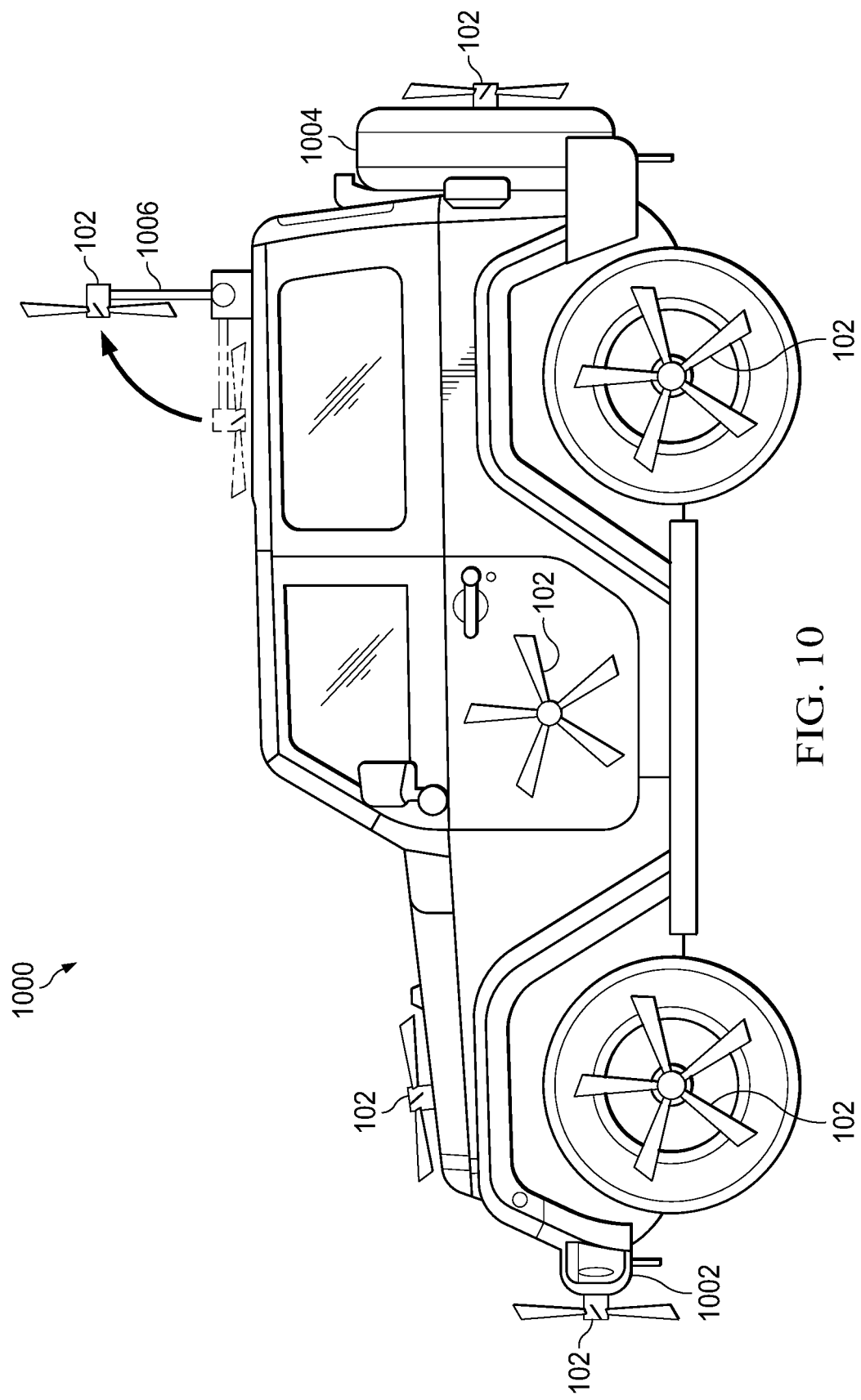

FIG. 10 illustrates another example EV or Hybrid vehicle 1000 equipped with multiple turbines 102. In the illustrated embodiment, the vehicle 1000 is a car (e.g., a sport utility vehicle). As illustrated, turbines 102 may be located on or form part of a hood, a bumper 1002, a side panel, a roof, tires, and on a back of the vehicle 1000 where a spare tire 1004 may be located. On the bumper 1002, the turbine(s) 102 may include blades constructed from the same material as the bumper. On the back of the vehicle 1000 where a spare tire 1004 would go, it may be desirable to include two or more turbines 102 to keep the back of the vehicle 1000 balanced. When the vehicle 1000 is not in use, or whenever desired by a vehicle operator, a cover may be disposed over the turbine 102 on the back of the vehicle 1000 to disguise the turbine 102 like a spare tire. It should be noted that a cover may be disposed over the turbine(s) 102 in any other locations of a vehicle as well, including all the turbine locations described in the present disclosure.

As illustrated via the turbine 102 on the roof of the vehicle 1000, a turbine 102 may include a plurality of blades coupled to a shaft 1006 that is selectively collapsible into an orientation substantially parallel to the portion (e.g., roof) of the body of the vehicle 1000 from which the turbine 102 extends. As such, the turbine 102 may be selectively rotated between a fully collapsed position that does not catch much wind and a fully extended position where the shaft 1006 is perpendicular to a direction in which the vehicle is moving. The positioning of the turbine 102 on the collapsible shaft 1006 may be controlled via a control system (e.g., 112) of the vehicle 1000. Other numbers, sizes, locations, and arrangements of turbines 102 may be used in other embodiments.

Figure 11:
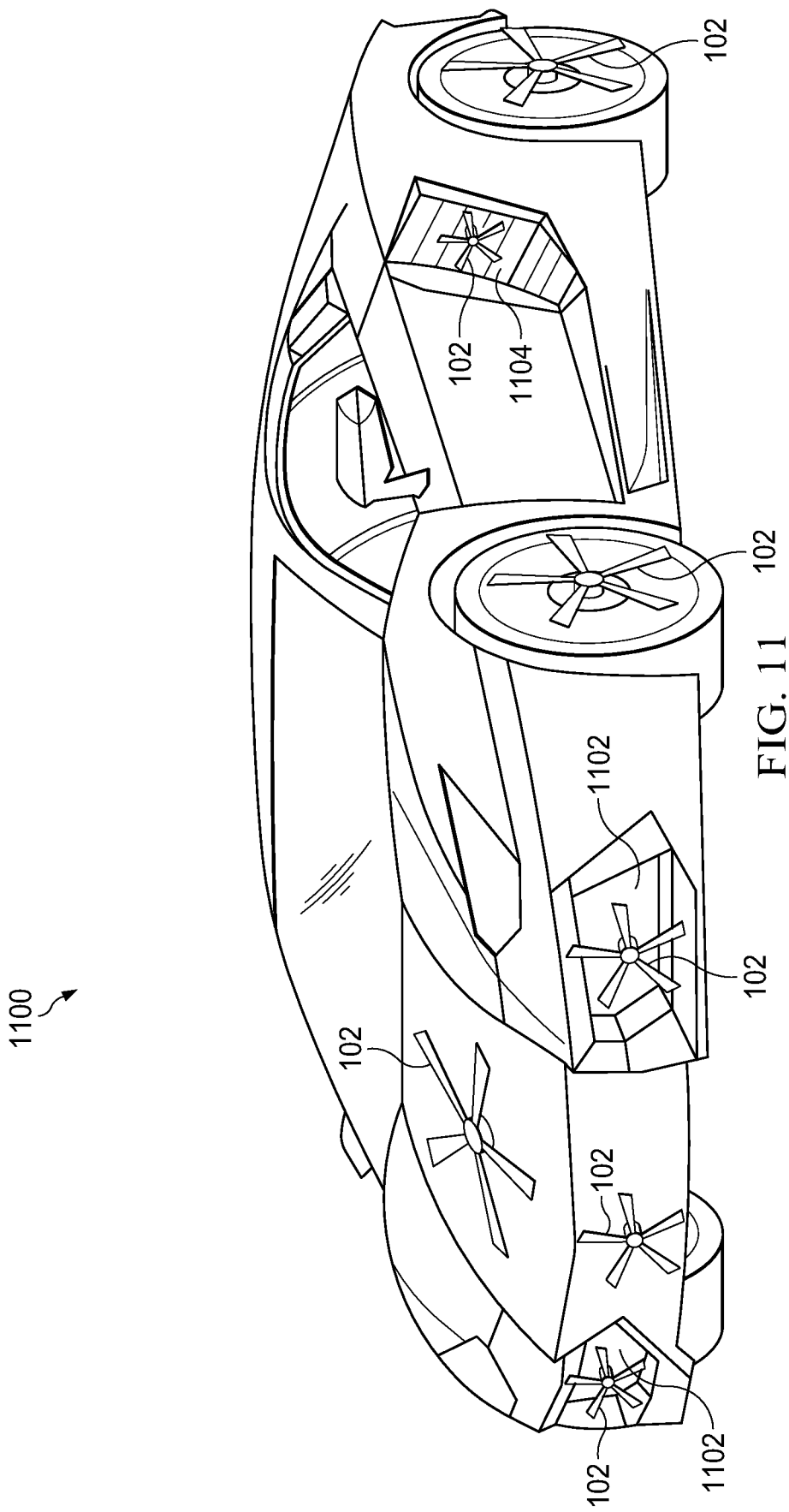

FIG. 11 illustrates another example EV or Hybrid vehicle 1100 equipped with multiple turbines 102. In the illustrated embodiment, the vehicle 1100 is a car (e.g., a sports car). As illustrated, turbines 102 may be located on or form part of a hood, a grill, tires, on headlights 1102 of the vehicle 1100, and in an indentation 1104 formed in the body of the vehicle 1100. Although the turbines 102 located on the headlights 1102 are illustrated as being in front of the headlights 1102, in other embodiments the bulb or bulb cover of the headlight 1102 may be out in front of the turbine 102. As illustrated, the vehicle 1100 may include a body having the indentation 1104 formed therein (e.g., along a side panel), and one or more turbines 102 may be located in the indentation 1104. This may help to conceal the turbine(s) 102 as well as aerodynamically funnel high speed wind into the indentation 1104 for capture by the turbine(s) 102. Other numbers, sizes, locations, and arrangements of turbines 102 may be used in other embodiments.

Figure 12:
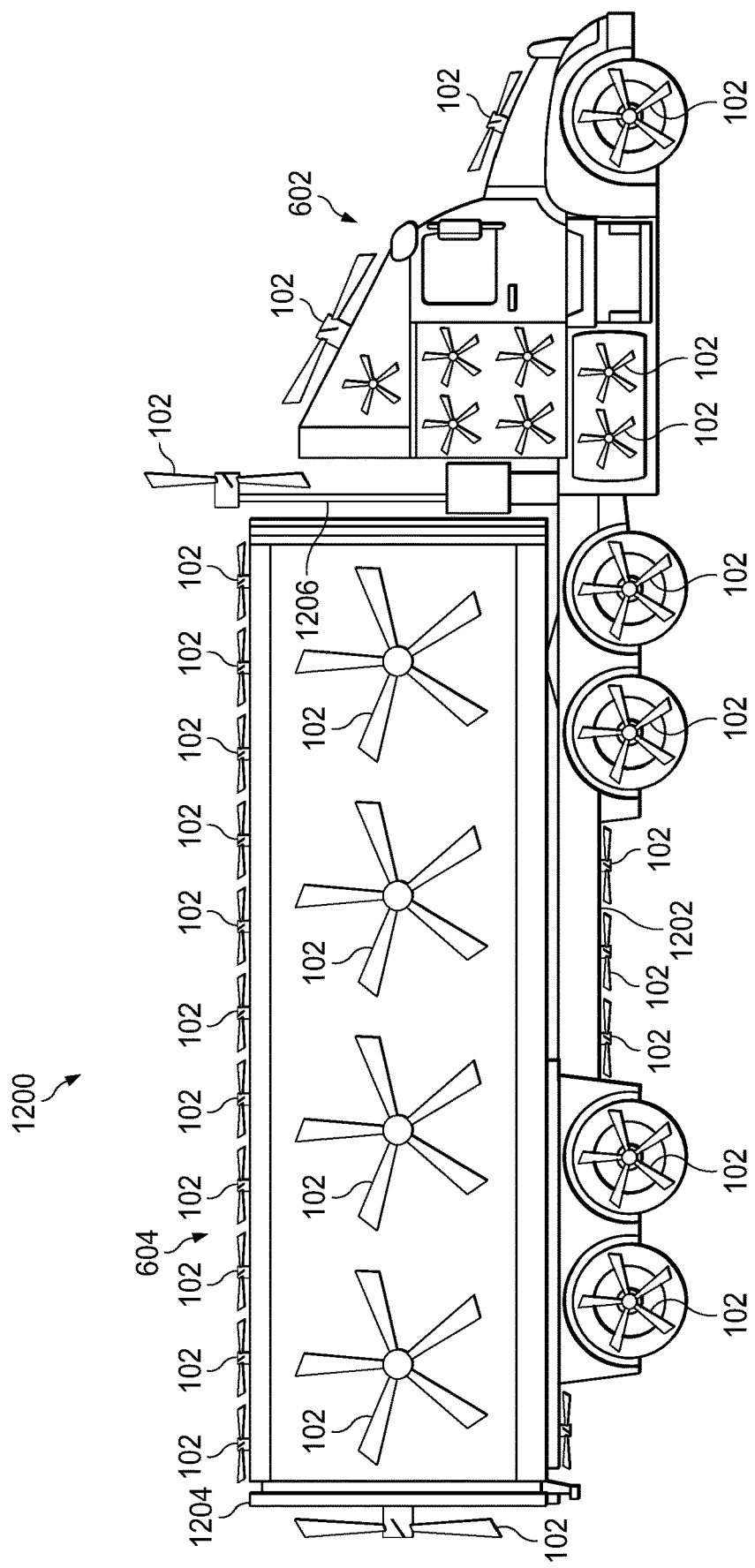

FIG. 12 illustrates another example EV or Hybrid vehicle 1200 equipped with multiple turbines 102 at various locations. In the illustrated embodiment, the vehicle 1200 is a semi-trailer truck having a cab or tractor portion 602 and a trailer portion 604. As illustrated, certain turbines 102 on the trailer portion 604 may be larger than those on the tractor portion 602. On the tractor portion 602, turbines 102 may be located on or form part of a hood, a roof, a side panel, and tires. In addition, on the trailer portion 604, turbines 102 may be located on or form part of a side panel, a roof, an undercarriage 1202, tires, and a back panel. In addition, as illustrated, one or more turbines 102 may be located in a space between the tractor portion 602 and the trailer portion 604, extending upward to capture wind coming directly over the front of the tractor portion 602. The space between the tractor portion 602 and the trailer portion 604 may be used to house one or more generators (e.g., 108 of FIG. 1) of the vehicle 1200 in other embodiments. Other numbers, sizes, locations, and arrangements of turbines 102 may be used in other embodiments.

Figure 13:
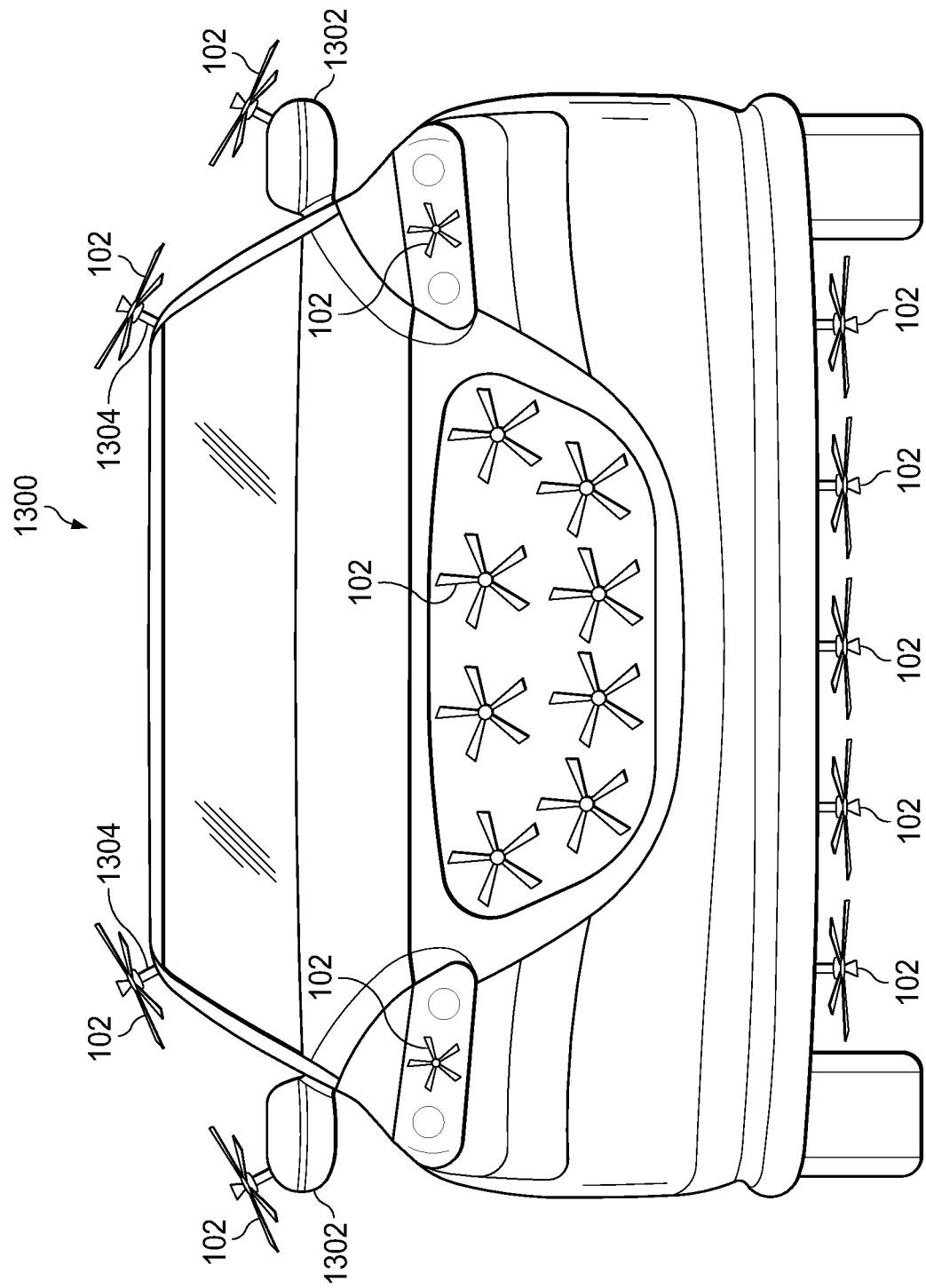

FIG. 13 illustrates another example EV or Hybrid vehicle 1300 equipped with multiple turbines 102. In the illustrated embodiment, the vehicle 1100 is a car (e.g., a sedan). As illustrated, turbines 102 may be located on or form part of a grill, an undercarriage, headlights, side view mirrors 1302, and positions of a roof rack 1304 on the top of the vehicle 1300. As illustrated, the grill of the vehicle 1300 could be made from the turbines 102. The turbines 102 forming the grill may be stacked vertically or horizontally, and even layered in a depth direction of the vehicle 1300. The turbines 102 located on the roof rack 1304 may be separate turbines 102 that are clipped onto the vehicle 1300, or they may be built into the roof rack 1304 from the beginning. In some embodiments, for example as discussed in greater detail below with reference to FIGS. 14A-B, the turbines 102 on the roof rack 1304 may be selectively collapsible into the roof rack, so that they are hidden whenever desired. Other numbers, sizes, locations, and arrangements of turbines 102 may be used in other embodiments.

In the embodiments of FIGS. 12 and 13, the vehicles 1200 and 1300 have multiple turbines 102 located on the undercarriage of the vehicle. These and other turbines 102 located around the vehicle may create lift on the bottom of the vehicle, which may reduce the load on the battery of the vehicle by reducing friction on the tires.

Figure 14A:
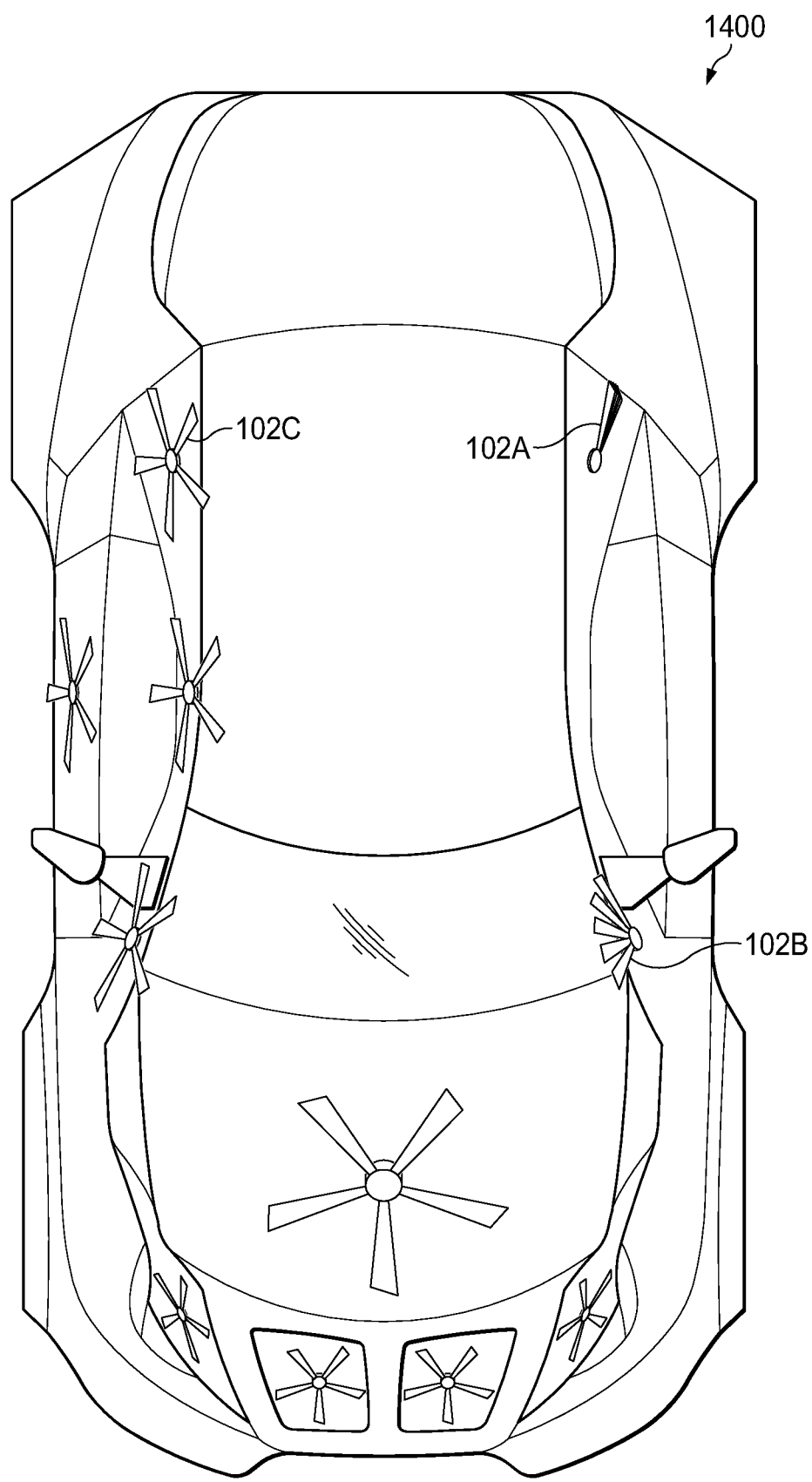
Figure 14B:
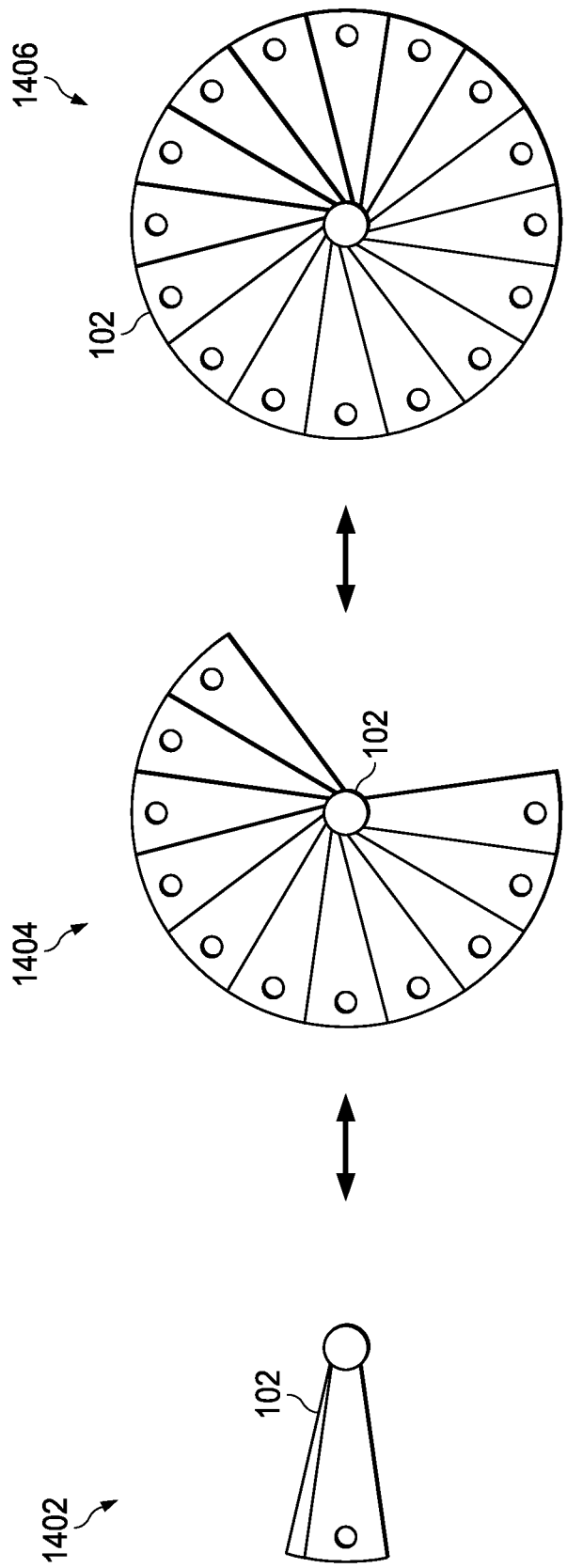
FIG. 14B is an example of a sequence of expanding and collapsing a series of blades that make up a turbine for use in an EV or Hybrid vehicle, in accordance with an embodiment of the present disclosure.

FIG. 14A illustrates another example EV or Hybrid vehicle 1400 equipped with multiple turbines 102. In the illustrated embodiment, the vehicle 1400 is a car, and the turbines 102 may be located on or form part of a hood, a grill, side view mirrors, a roof, and a side panel of the vehicle 1400. As illustrated, one or more of the turbines 102 may be selectively collapsible against the body of the vehicle 1400. For example, a turbine 102A is in a fully collapsed configuration, a turbine 102B is in a partially collapsed configuration, and another turbine 102C is in a fully expanded configuration. FIG. 14B illustrates a detailed progression of the blades of a turbine 102 from a fully collapsed configuration at 1402 to a partially opened configuration at 1404 to a fully opened configuration at 1406. As illustrated, the turbine 102 may include a plurality of collapsible blades configured to collapse rotationally over each other to fit into an approximate footprint (e.g., within 10% of the footprint) of a single turbine blade. The turbine 102 may be controlled to open and close the blades via the control system (e.g., 112 of FIG. 1) based on user input from a driver of the vehicle or based on preprogrammed operational instructions. The collapsible blades help to aesthetically conceal the turbines 102 whenever desired.

Figure 15A:
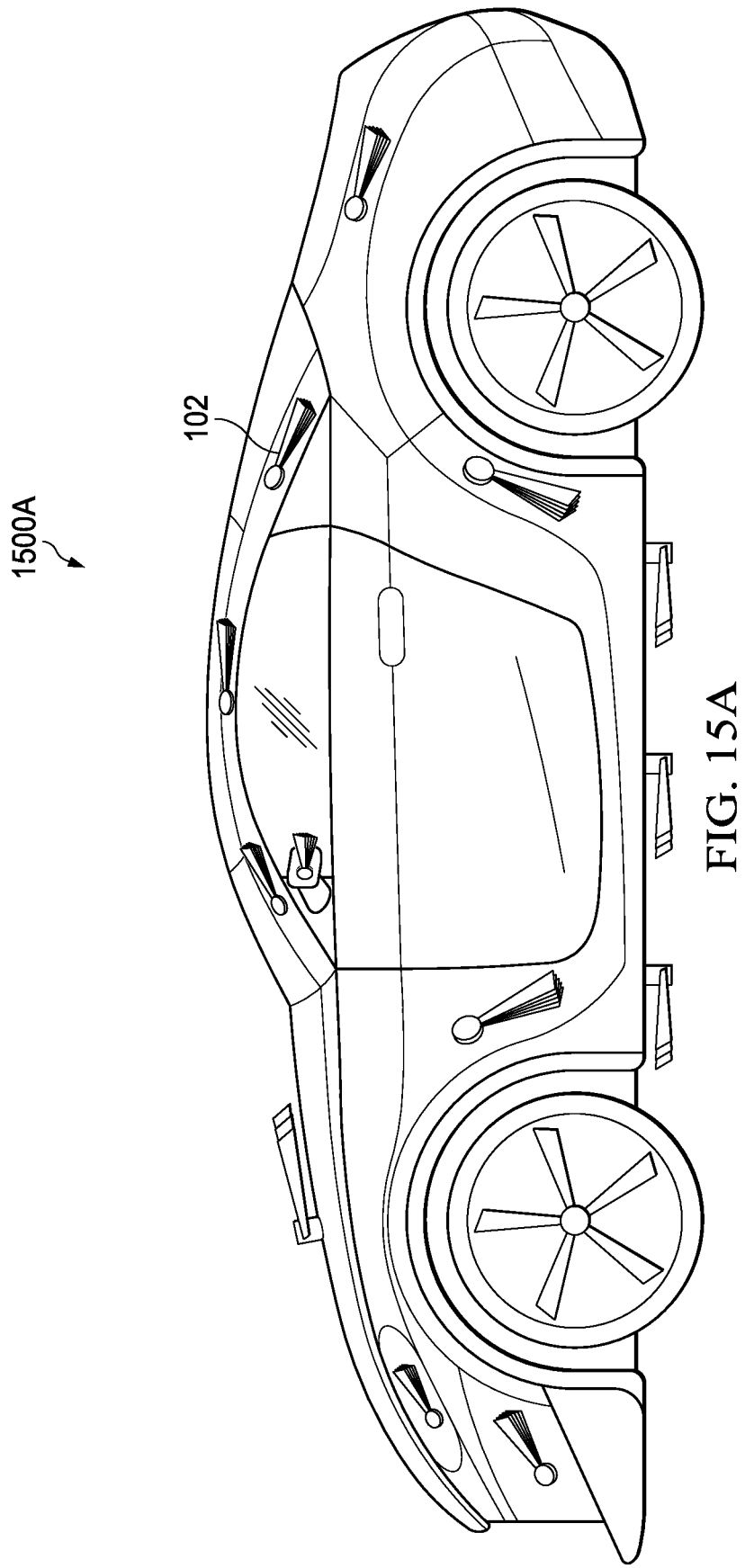
FIGS. 15A-19 are examples of other EV or Hybrid vehicles equipped with multiple turbines, in accordance with an embodiment of the present disclosure.
Figure 15B:
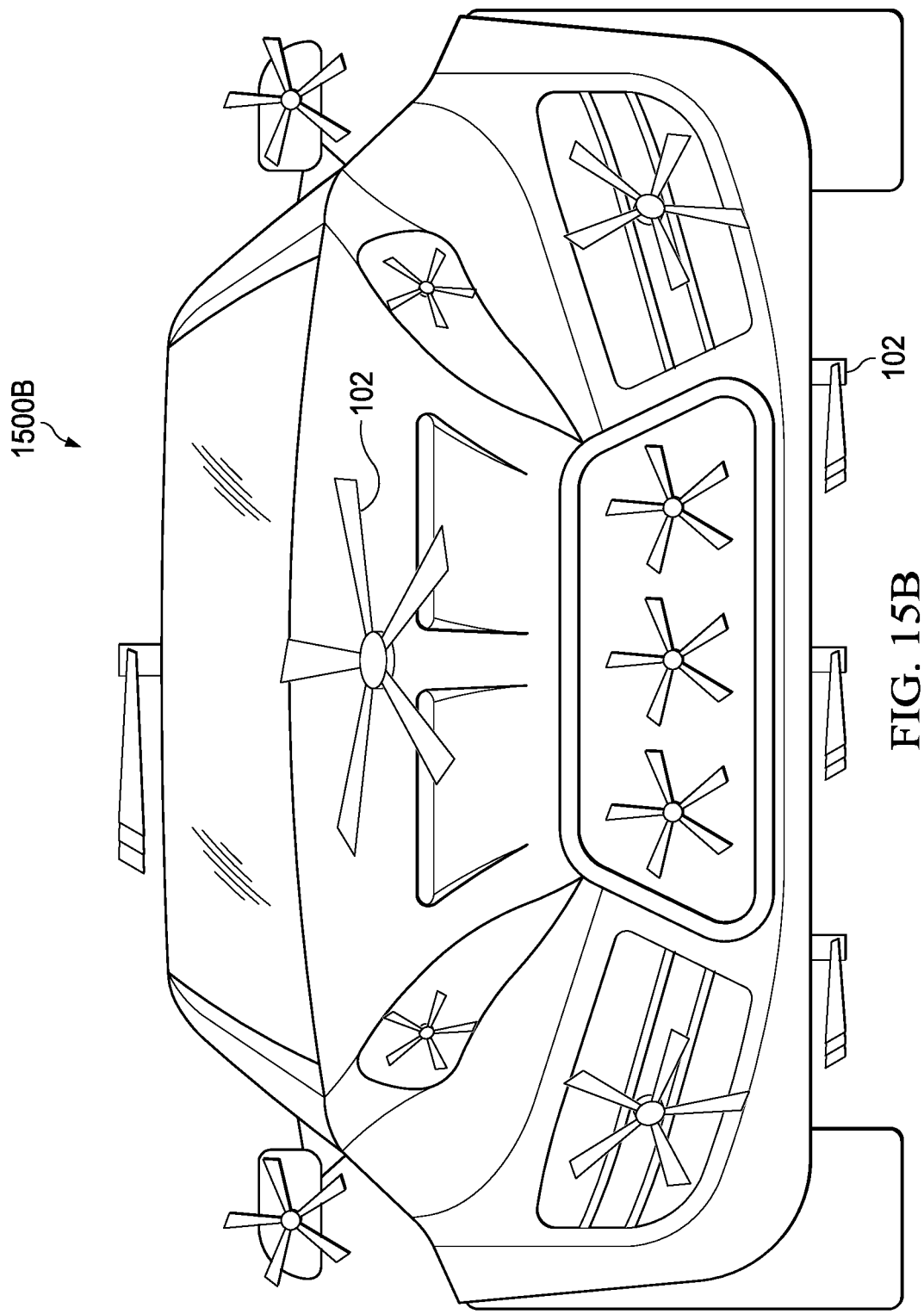

FIG. 15A illustrates an example EV or Hybrid vehicle 1500A equipped with multiple turbines 102, all of which are presently in the fully collapsed configuration. FIG. 15B illustrates another vehicle 1500B having some turbines 102 (e.g., on the undercarriage and the roof) in the fully collapsed configuration, and all other turbines 102 in the fully opened configuration. As shown in FIGS. 15A and 15B, the turbines 102 may be controlled to all be switched from closed to open together (FIG. 15A), or the turbines 102 may be independently controlled to switch between closed and open as controlled by a user and/or the vehicle control system.

Figure 16A:
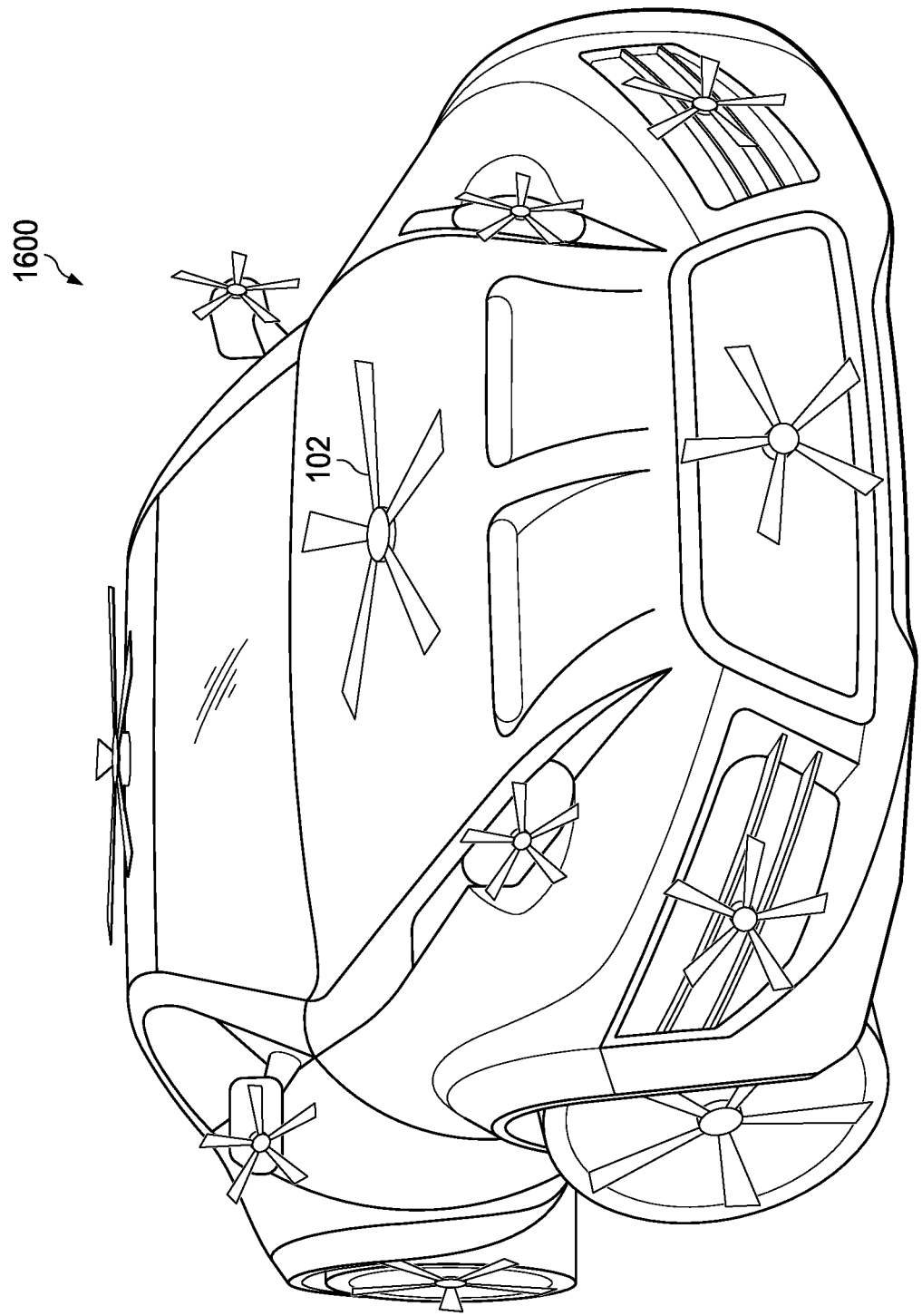
Figure 16B:
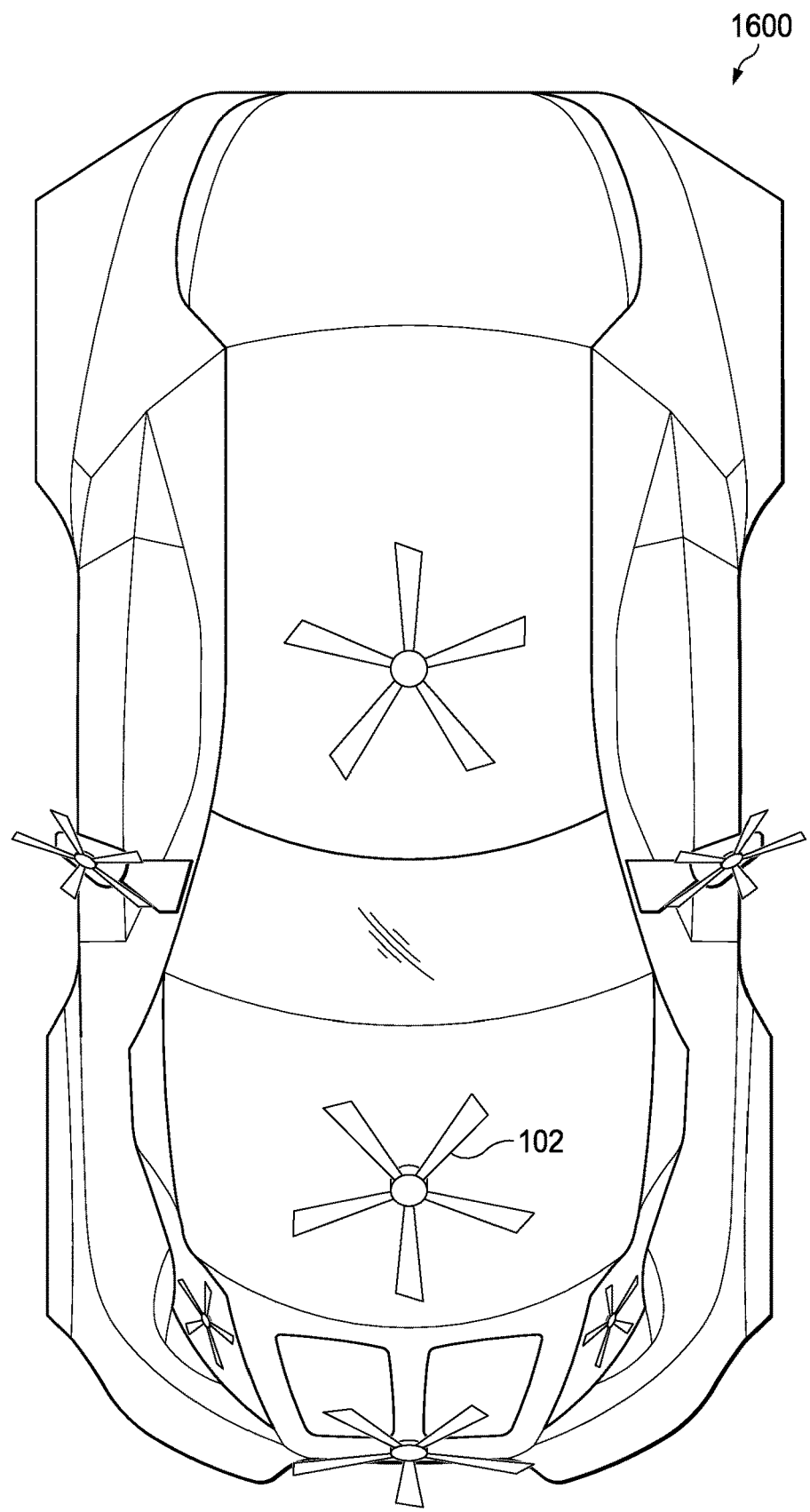

FIGS. 16A and 16B illustrate another example EV or Hybrid vehicle 1600 equipped with multiple turbines 102. In the illustrated embodiment, the vehicle 1600 is a car, and the turbines 102 may be located on or form part of a hood, a grill, headlights, side view mirrors, a roof, and tires of the vehicle 1600.

Figure 17:
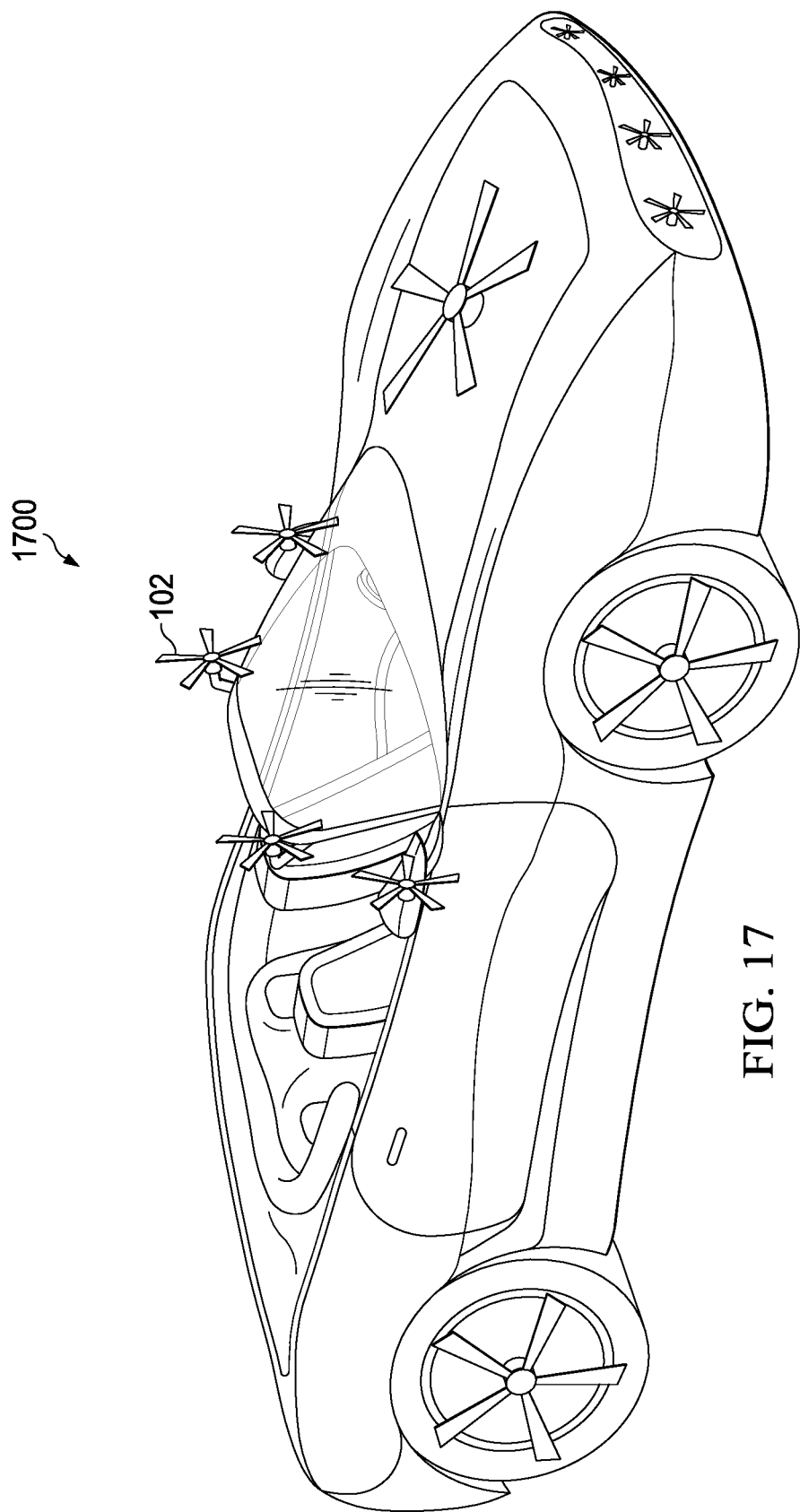

FIG. 17 illustrates another example EV or Hybrid vehicle 1700 equipped with multiple turbines 102. In the illustrated embodiment, the vehicle 1700 is a car (e.g., a convertible), and the turbines 102 may be located on or form part of a hood, a grill, side view mirrors, tires, and at the edges of a windshield of the vehicle 1700.

Figure 18:
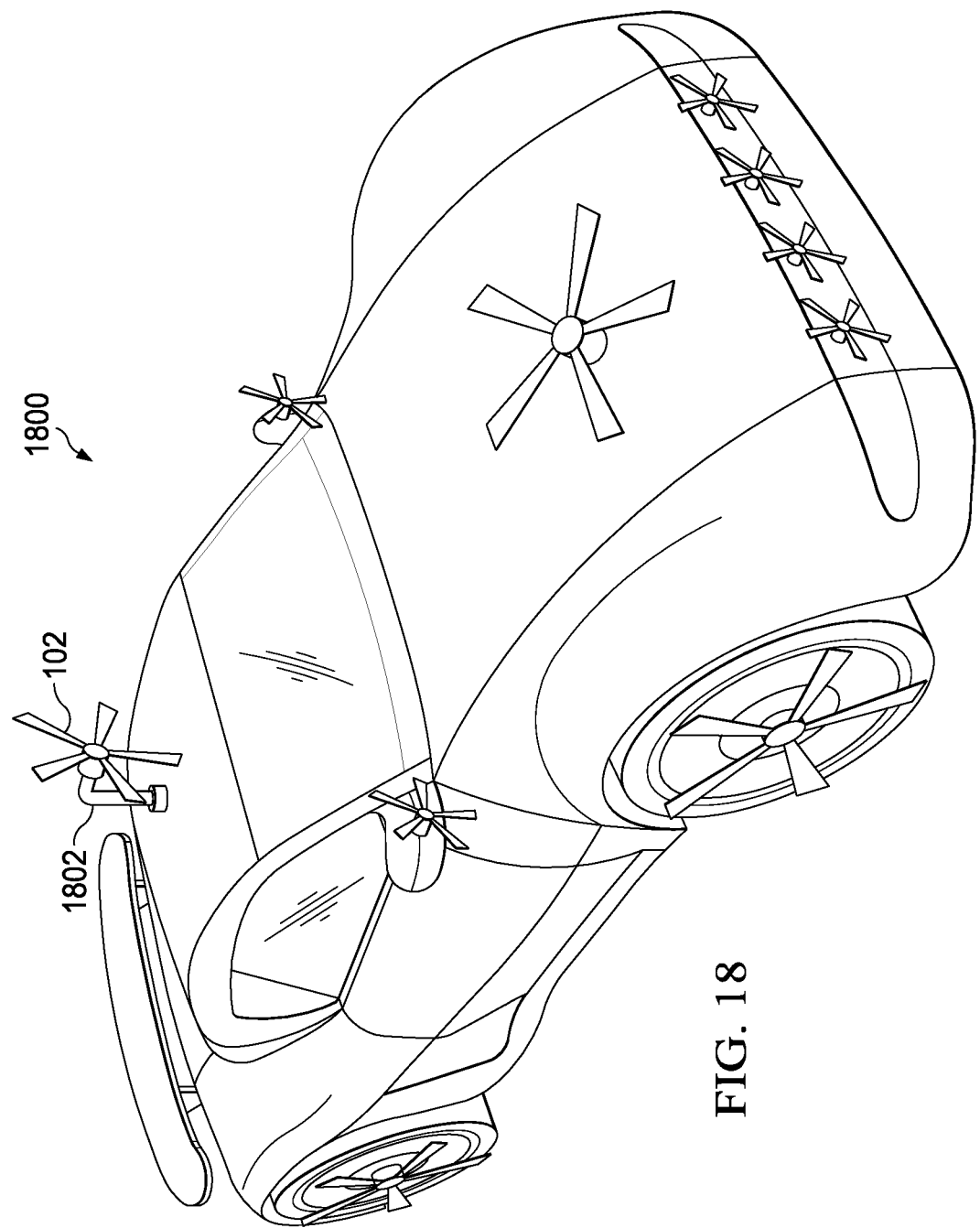

FIG. 18 illustrates another example EV or Hybrid vehicle 1800 equipped with multiple turbines 102. In the illustrated embodiment, the vehicle 1800 is a car, and the turbines 102 may be located on or form part of a hood, a grill, side view mirrors, tires, and a roof of the vehicle 1800. The illustrated turbine 102 located on the roof of the vehicle 1800 is extending upward from the roof via a connecting rod 1802, which may be rotatable about its axis. The connecting rod 1802 may be controlled to rotate about its axis so as to change the direction in which the turbine blades face. The connecting rod 1802 may be controlled to rotate in response to feedback from one or more wind sensors (e.g., 306 of FIG. 3) to maximize the amount of wind energy captured. Other numbers, sizes, locations, and arrangements of turbines 102 may be used in other embodiments.

Figure 19:
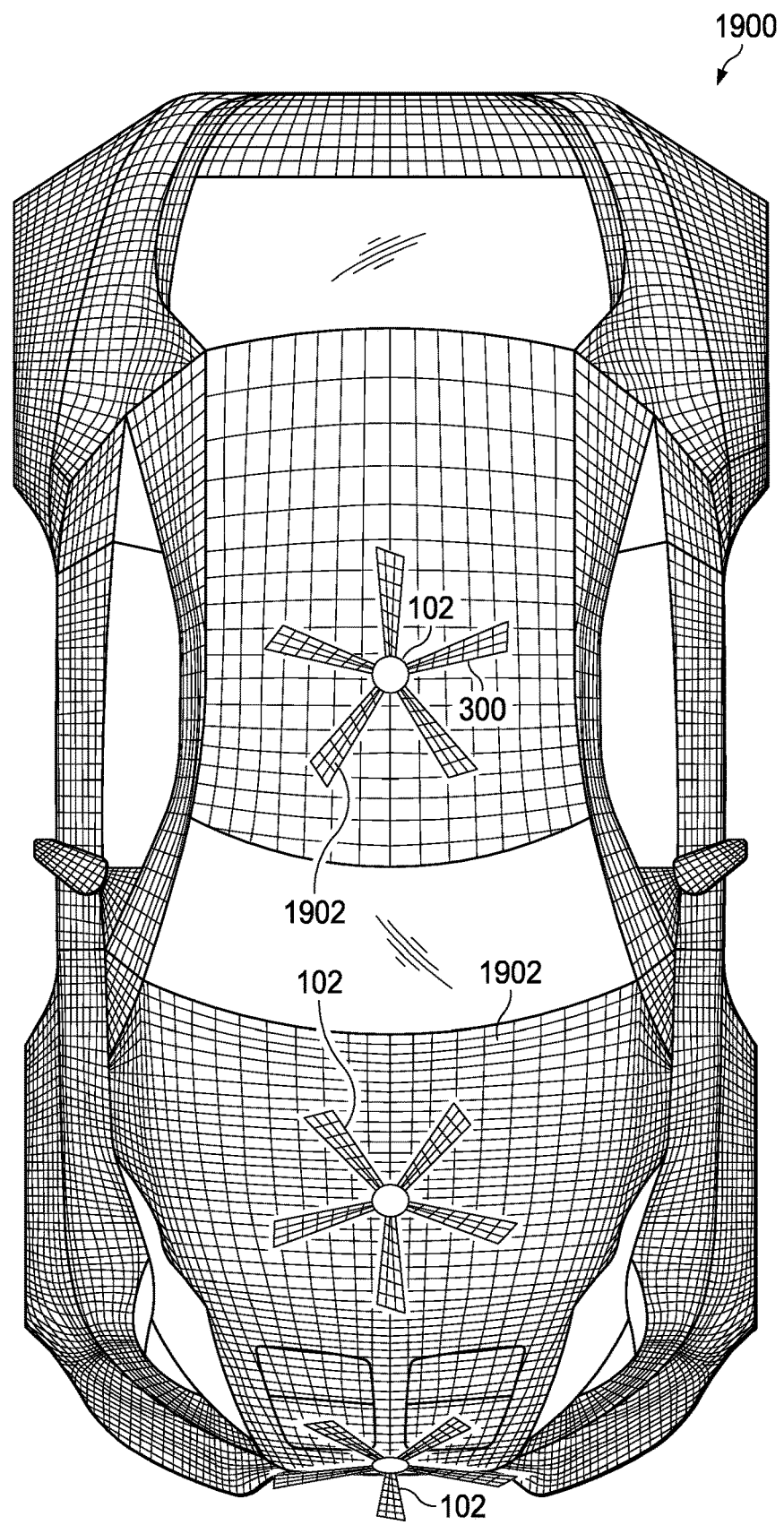

FIG. 19 illustrates another example EV or Hybrid vehicle 1900 equipped with multiple turbines 102. In the illustrated embodiment, the vehicle 1900 is a car, and the turbines 102 may be located on or form part of a roof, a hood, and a grill of the vehicle 1900. The vehicle 1900 further includes solar cells or panels 1902 disposed on a body of the vehicle 1900. The solar cells or panels 1902 are visually represented by grid lines on the vehicle 1900. These solar cells or panels 1902 may form part of a solar power generation system (e.g., 202 of FIG. 2) of the vehicle 1900 used to capture additional renewable energy for operating the vehicle 1900. In addition, the blades 300 of the turbines 102 on the vehicle 1900 may similarly have solar cells or panels 1902 located thereon. The solar cells or panels 1902 on the turbine blades 300 may help the turbines 102 aesthetically blend with the rest of the body of the vehicle 1900. The solar cells or panels 1902 on the turbine blades 300 may similarly be part of a solar power generation system of the vehicle 1900 used to capture additional renewable energy for operating the vehicle 1900. As such, the blades 300 may have solar cells or panels 1902 to generate not only both naturally occurring renewable energy sources, but to also conceal the appearance of the turbines 102.

Depending on the availability of space within an EV or Hybrid vehicle's make, model, and size, the range of the vehicle can be increased so as to not have to stop for recharging the battery during long-distance travel. The longer the vehicle's driving range, the more attractive the vehicle becomes to consumers.

The disclosed embodiments capture the power collected by wind turbines (e.g., micro-turbines) placed in different locations of the vehicle. The faster the vehicle's speed (combined with durations of the sustained speeds), the more power can be extracted by the wind turbines. Trucks (e.g., semi-trailer trucks) may have turbines with larger blades, which produce a greater amount of power than micro-turbines. Airflow around the external and internal structure of the vehicle may be used to power the vehicles via the turbines. Such airflow collection may come from, for example: areas in the front of the vehicle including the grill, bumper, headlights, and the hood; the roof of the vehicle, where the turbines may be incorporated into the roof itself or attached to installed roof rails by clips or straps; hidden where a typical spare tire is located; on sides of the vehicle such as in hidden locations; an undercarriage of the vehicle receiving airflow formed by a cavity between the floor and the inside of the vehicle.

The wind energy used to extract power needs to recover the aerodynamic drag of the vehicle. If air streams are allowed to flow in the proper direction, then the drag amounts will be reduced while generating electricity for the vehicle. Proper positioning of the turbines on the vehicle may help avoid creating additional drag on the vehicle. Symmetrical positioning of the turbines can help balance the thrust acting on the turbines in different directions. Micro-turbines may be set in parallel with the flow of air around the vehicle. This arrangement does not create additional thrust in the direction of propulsion.

The energy (electricity) harvested from the wind turbines placed in EV or Hybrid vehicles may readily offset the initial installation cost, as well as provide virtually free energy for years. Unlike most stationary wind turbines dependent on wide range of weather conditions and irregular wind-flow speeds, the disclosed wind turbines located on vehicles bypass all the weather-related dependency issues as it taps into a more stable, reliable, and always available flow of wind energy around the vehicles while they are operated. The technology serves to mitigate many challenges posed by expensive batteries, charging stations, and related high costs of supply-chain procurement and transportation problems to the wide acceptance of EV or Hybrid vehicles for clean energy transportation.

The disclosure includes other illustrative embodiments, such as the following.

Embodiment 1. An electric or Hybrid vehicle, including: a battery configured to provide motive power to the vehicle; one or more electrical systems controlling one or more operations of the vehicle; a turbine configured to be exposed to airflow while the vehicle is in motion; a generator coupled to the turbine and configured to generate electricity in response to rotation of the turbine; and a control system configured to selectively control flow of electricity from the generator to the battery for charging the battery and to the one or more electrical systems for powering the one or more electrical systems.

Embodiment 2. The vehicle of Embodiment 1, wherein the one or more electrical systems include a motor used to convert electrical energy from the battery to rotational energy for moving the vehicle.

Embodiment 3. The vehicle of Embodiment 1, wherein the one or more electrical systems operate at least one auxiliary function of the vehicle selected from the list consisting of: power steering, power windows, headlights, exterior lights, interior lights, windshield wipers, defroster, sensors, audio system, digital communication system, and display.

Embodiment 4. The vehicle of Embodiment 1, further including: a plurality of turbines each configured to be exposed to airflow while the vehicle is in motion; and one or more generators coupled to the plurality of turbines and configured to generate electricity in response to rotation of the plurality of turbines, wherein the control system is configured to selectively control flow of electricity from each of the one or more generators to the battery and to the one or more electrical systems.

Embodiment 5. The vehicle of Embodiment 1, further including a second turbine coupled to the generator, wherein the second turbine is configured to be exposed to airflow while the vehicle is in motion, and wherein the generator is configured to generate electricity in response to rotation of both the turbine and the second turbine.

Embodiment 6. The vehicle of Embodiment 5, wherein the second turbine is coupled along a shaft between the turbine and the generator.

Embodiment 7. The vehicle of Embodiment 5, wherein the turbine and the second turbine are coupled in parallel to a gearbox coupled to the generator, wherein the gearbox is coupled to the generator via a shaft.

Embodiment 8. The vehicle of Embodiment 1, further including an inverter coupled to the generator, the inverter configured to convert the electricity output from the generator to an AC voltage that is usable in the one or more electrical systems of the vehicle.

Embodiment 9. The vehicle of Embodiment 1, further including a solar power generation system having one or more solar cells or panels on an outside surface of the vehicle, wherein the control system is configured to selectively control flow of electricity from the solar power generation system to the battery for charging the battery and to the one or more electrical systems for powering the one or more electrical systems.

Embodiment 10. The vehicle of Embodiment 9, wherein at least one solar cell or panel of the solar power generation system is located on a blade of the turbine.

Embodiment 11. The vehicle of Embodiment 1, further including an electrical port coupled to the battery and to the one or more vehicle electrical systems, wherein the turbine and the generator do not form part of a body of the vehicle and are retrofit onto the body of the vehicle via connection at the electrical port.

Embodiment 12. The vehicle of Embodiment 1, wherein the turbine forms part of a body of the vehicle.

Embodiment 13. The vehicle of Embodiment 12, wherein the turbine forms part of a grill, a hood, a roof, a roof rack, a side panel, a windshield, a back door, a headlight, a side view mirror, an undercarriage, or a bumper of the vehicle.

Embodiment 14. The vehicle of Embodiment 1, wherein the turbine is located proximate to a wheel of the vehicle.

Embodiment 15. The vehicle of Embodiment 1, wherein the turbine is located along an axle used to turn a wheel of the vehicle.

Embodiment 16. The vehicle of Embodiment 1, further including a wind sensor located proximate to the turbine and communicatively coupled to the control system, wherein the control system is configured to adjust a direction of the turbine and/or a direction of blades of the turbine to maximize an amount of air flow to which the turbine is exposed, in response to feedback from the wind sensor.

Embodiment 17. The vehicle of Embodiment 1, wherein the turbine includes: a plurality of blades; and a smart display sheet adhered to or integrally formed into at least a portion of the plurality of blades.

Embodiment 18. The vehicle of Embodiment 1, wherein the turbine includes a plurality of blades coupled to a shaft, wherein the shaft has an adjustable length.

Embodiment 19. The vehicle of Embodiment 1, wherein the vehicle is a car, truck, bus, train, plane, or boat.

Embodiment 20. The vehicle of Embodiment 1, wherein the vehicle includes a body having an indentation formed therein, wherein the turbine is located in the indentation.

Embodiment 21. The vehicle of Embodiment 1, wherein the turbine is disposed over or forms part of a headlight of the vehicle.

Embodiment 22. The vehicle of Embodiment 1, wherein the turbine includes a plurality of collapsible blades configured to collapse rotationally over each other to fit into an approximate footprint of a single turbine blade.

Embodiment 23. The vehicle of Embodiment 1, wherein the turbine is coupled to a portion of a body of the vehicle, wherein the turbine includes a plurality of blades coupled to a shaft, wherein the shaft is selectively collapsible into an orientation substantially parallel to the portion of the body of the vehicle.

Embodiment 24. The vehicle of Embodiment 1, wherein the turbine includes a plurality of blades coupled to a shaft, wherein the plurality of blades are oriented substantially parallel to a portion of a body of the vehicle along which the turbine is located.

Embodiment 25. The vehicle of Embodiment 1, wherein the generator is integrated with the turbine.

Embodiment 26. The vehicle of Embodiment 1, wherein the generator is separate from and positioned apart from the turbine, and coupled to the turbine via a shaft.

Embodiment 27. The vehicle of Embodiment 1, further including a display communicatively coupled to the control system, the display configured to indicate how fast the battery is being recharged, or how fast the battery can be recharged if the vehicle maintains a certain speed during operation of the vehicle.

Embodiment 28. An electric or Hybrid vehicle, including: a body; a battery configured to provide motive power to the vehicle; a turbine configured to be exposed to airflow while the vehicle is in motion; a generator coupled between the turbine and the battery and configured to generate electricity in response to rotation of the turbine and provide the generated electricity to the battery for charging the battery; and a solar power generation system including one or more solar cells or panels disposed on the body, the solar power generation system configured to generate electricity from solar energy and output the generated electricity to the battery for charging the battery.

Embodiment 29. An electric or Hybrid vehicle, including: a battery configured to provide motive power to the vehicle; a turbine including a plurality of blades coupled to a shaft, the turbine configured to be exposed to airflow while the vehicle is in motion; a generator coupled between the turbine and the battery and configured to generate electricity in response to rotation of the turbine and provide the generated electricity to the battery for charging the battery; and a solar power generation system including at least one solar cell or panel disposed on a blade of the turbine, the solar power generation system configured to generate electricity from solar energy and output the generated electricity to the battery for charging the battery.

Embodiment 30. The vehicle of Embodiment 29, further including: a body having one or more solar cells or panels of the solar power generation system disposed thereon.

Although the present disclosure and its advantages have been described in detail, it should be understood that various changes, substitutions and alterations can be made herein without departing from the scope of the disclosure as defined by the following claims.

What is claimed is:

1. An electric or Hybrid vehicle, comprising:
   a battery configured to provide motive power to the vehicle;
   one or more electrical systems controlling one or more operations of the vehicle;
   at least one turbine comprising a plurality of blades coupled to a shaft and configured to be exposed to airflow in an extended position while the vehicle is in motion, wherein the shaft has an adjustable length that telescopes between a retracted position having the plurality of blades disposed under an outer surface of a hood of the vehicle and the extended position having the plurality of blades disposed above the hood of the vehicle;
   an actuator configured to telescope the length of the shaft between the retracted position and the extended position, wherein the actuator comprises a hydraulic actuator, and wherein the actuator is disposed under the hood of the vehicle;
   at least one generator coupled to the at least one turbine and configured to generate electricity in response to rotation of the at least one turbine; and
   a control system configured to selectively control flow of electricity from the at least one generator to the battery for charging the battery and to the one or more electrical systems for powering the one or more electrical systems.

2. The vehicle of claim 1, wherein the one or more electrical systems comprise a motor used to convert electrical energy from the battery to rotational energy for moving the vehicle.

3. The vehicle of claim 1, wherein the one or more electrical systems operate at least one auxiliary function of the vehicle selected from the list consisting of: power steering, power windows, headlights, exterior lights, interior lights, windshield wipers, defroster, sensors, audio system, digital communication system, and display.

4. The vehicle of claim 1, wherein the at least one turbine comprises a plurality of turbines each configured to be exposed to airflow while the vehicle is in motion, wherein the at least one generator is coupled to the plurality of turbines and configured to generate electricity in response to rotation of the plurality of turbines, and wherein the control system is configured to selectively control flow of electricity from the at least one generator to the battery and to the one or more electrical systems.

5. The vehicle of claim 1, wherein the at least one turbine comprises a first turbine and a second turbine each coupled to the at least one generator, wherein the second turbine is configured to be exposed to airflow while the vehicle is in motion, and wherein the at least one generator is configured to generate electricity in response to rotation of both the first turbine and the second turbine.

6. The vehicle of claim 5, wherein the second turbine is coupled along the shaft between the first turbine and the at least one generator.

7. The vehicle of claim 5, wherein the first turbine and the second turbine are coupled in parallel to a gearbox coupled to the at least one generator, wherein the gearbox is coupled to the at least one generator via the shaft.

8. The vehicle of claim 1, further comprising an inverter coupled to the at least one generator, the inverter configured to convert the electricity output from the at least one generator to an AC voltage that is usable in the one or more electrical systems of the vehicle.

9. The vehicle of claim 1, further comprising a solar power generation system having one or more solar cells or solar panels on an outside surface of the vehicle,
wherein the control system is configured to selectively control flow of electricity from the solar power generation system to the battery for charging the battery and to the one or more electrical systems for powering the one or more electrical systems.

10. The vehicle of claim 1, further comprising an electrical port coupled to the battery and to the one or more vehicle electrical systems,
wherein the at least one turbine and the at least one generator do not form part of a body of the vehicle and are retrofit onto the body of the vehicle via connection at the electrical port.

11. The vehicle of claim 1, wherein the at least one turbine is located proximate to a wheel of the vehicle.

12. The vehicle of claim 1, wherein the at least one turbine is located along an axle used to turn a wheel of the vehicle.

13. The vehicle of claim 1, further comprising a wind sensor located proximate to the at least one turbine and communicatively coupled to the control system, wherein the control system is configured to adjust a direction of the at least one turbine and/or a direction of the plurality of blades of the at least one turbine to maximize an amount of air flow to which the at least one turbine is exposed, in response to feedback from the wind sensor.

14. The vehicle of claim 1, wherein the vehicle is a car, truck, bus, train, plane, or boat.

15. The vehicle of claim 1, wherein the vehicle comprises a body having an indentation formed therein, wherein the at least one turbine is located in the indentation.

16. The vehicle of claim 1, wherein the at least one turbine is disposed over or forms part of a headlight of the vehicle.

17. The vehicle of claim 1, wherein the plurality of blades of the at least one turbine comprises a plurality of collapsible blades configured to collapse rotationally over each other to fit into an approximate footprint of a single turbine blade.

18. The vehicle of claim 1, wherein the at least one turbine is coupled to a portion of a body of the vehicle, wherein the shaft is selectively collapsible into an orientation substantially parallel to the portion of the body of the vehicle.

19. The vehicle of claim 1, wherein the plurality of blades are oriented substantially parallel to a portion of a body of the vehicle along which the at least one turbine is located.

20. The vehicle of claim 1, wherein the at least one generator is integrated with the at least one turbine.

21. The vehicle of claim 1, wherein the at least one generator is separate from and positioned apart from the at least one turbine, and coupled to the at least one turbine via the shaft.

22. The vehicle of claim 1, further comprising a display communicatively coupled to the control system, the display configured to indicate how fast the battery is being recharged, or how fast the battery can be recharged if the vehicle maintains a certain speed during operation of the vehicle.

23. The vehicle of claim 1, wherein a base of the shaft is disposed within the hood of the vehicle.

24. The system of claim 1, wherein the at least one turbine comprises a first turbine and a second turbine, wherein the first turbine and the second turbine are disposed on opposing sides of a wheel of the vehicle.

25. An electric or Hybrid vehicle, comprising:
a battery configured to provide motive power to the vehicle;
one or more electrical systems controlling one or more operations of the vehicle;
a turbine configured to be exposed to airflow while the vehicle is in motion; wherein the turbine comprises:
a plurality of blades; and
a smart display sheet adhered to or integrally formed into at least a portion of the plurality of blades, wherein the smart display sheet comprises:
a substrate layer comprising a recess;
a display panel disposed within the recess of the substrate layer, wherein the display panel is capable of displaying at least one image;
a transparent cover layer disposed on the display panel;
a frame disposed against an exterior surface of the substrate layer, wherein the frame comprises a retainer lip configured to hold the display panel within the recess of the substrate layer; and
a protective layer disposed adjacent to the transparent cover layer and capable of protecting the at least one display panel from environmental elements comprising heat and cold; and
a generator coupled to the turbine and configured to generate electricity in response to rotation of the turbine; and
a control system configured to selectively control flow of electricity from the generator to the battery for charging the battery and to the one or more electrical systems for powering the one or more electrical systems.

26. An electric or Hybrid vehicle, comprising:
a battery configured to provide motive power to the vehicle;
a turbine comprising a plurality of blades, wherein the turbine is configured to be exposed to airflow while the vehicle is in motion;
a generator coupled between the turbine and the battery and configured to generate electricity in response to rotation of the turbine and provide the generated electricity to the battery for charging the battery; and a solar power generation system comprising at least one solar cell disposed on at least one blade of the plurality of blades of the turbine or at least one solar panel disposed on at least one blade of the plurality of blades of the turbine, the solar power generation system configured to generate electricity from solar energy and output the generated electricity to the battery for charging the battery.

27. The vehicle of claim 26, further comprising:
a body having one or more solar cells or solar panels of the solar power generation system disposed thereon.

* * * * *